United States Patent
Shikama

[19]

[11] Patent Number: 5,986,816
[45] Date of Patent: Nov. 16, 1999

[54] EYEPIECE OPTICAL SYSTEM AND EYEPIECE IMAGE DISPLAY DEVICE

[75] Inventor: Shinsuke Shikama, Tokyo, Japan

[73] Assignee: Mitsubishi Denki Kabushiki Kaisha, Tokyo, Japan

[21] Appl. No.: 09/033,482

[22] Filed: Mar. 3, 1998

[30] Foreign Application Priority Data

Mar. 10, 1997 [JP] Japan ..................................... 9-054970
Jul. 1, 1997 [JP] Japan ..................................... 9-175772

[51] Int. Cl.$^6$ .................................................. G02B 25/00
[52] U.S. Cl. ............................................ 359/644; 359/715
[58] Field of Search .................................... 359/643, 644, 359/648, 725, 708, 715, 645, 716, 630, 646; 351/158, 209

[56] References Cited

U.S. PATENT DOCUMENTS

| | | | |
|---|---|---|---|
| 5,568,319 | 10/1996 | Kaneko et al. ........................... | 359/643 |
| 5,627,680 | 5/1997 | Suzuki ..................................... | 359/645 |
| 5,638,213 | 6/1997 | Ueno ....................................... | 359/643 |
| 5,684,635 | 11/1997 | Sugawara ................................. | 359/643 |
| 5,691,850 | 11/1997 | Arisaka .................................... | 359/644 |
| 5,726,808 | 3/1998 | Suzuki ..................................... | 359/643 |
| 5,757,553 | 5/1998 | Sugawara ................................. | 359/643 |
| 5,764,418 | 6/1998 | Sato et al. ................................ | 359/646 |
| 5,835,279 | 10/1998 | Marshall et al. ........................ | 359/645 |

FOREIGN PATENT DOCUMENTS

| | | |
|---|---|---|
| 40-009090 | 3/1940 | Japan . |
| 50-151163 | 12/1975 | Japan . |
| 51-120231 | 10/1976 | Japan . |
| 52-072242 | 6/1977 | Japan . |
| 3087709 | 4/1991 | Japan . |

*Primary Examiner*—Georgia Epps
*Assistant Examiner*—David N. Spector

[57] ABSTRACT

An eyepiece optical system for projecting a plane image on a two-dimensional display element onto an eyeball as an extended virtual image, comprises a first group of lenses G1 including a positive meniscus lens L1 having a concave face toward the eyeball, a both-face aspeherical lens L2 and a both-face aspherical lens L3 having both convex faces in the vicinity of center and positive paraxial refractive power; and a second group of lenses G2 including a both-face aspherical lens L4 having both concave faces in the vicinity of center and negative paraxial refractive power, the first and second groups of lenses being arranged in order from the side of the eyeball. An eyepiece image display device uses such an eyepiece optical system.

23 Claims, 20 Drawing Sheets

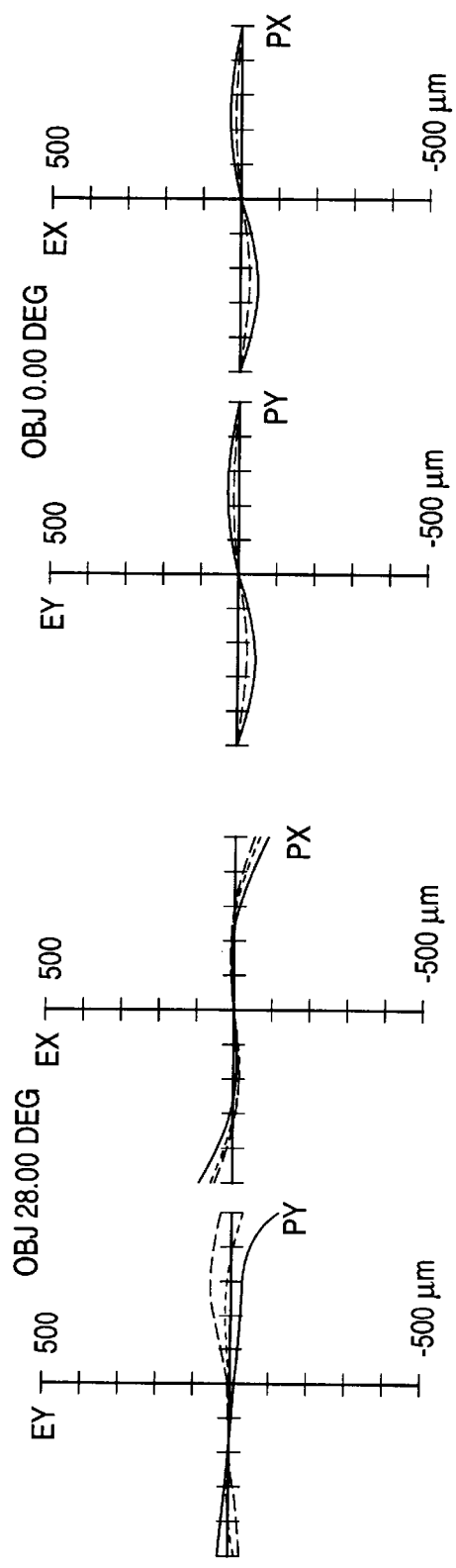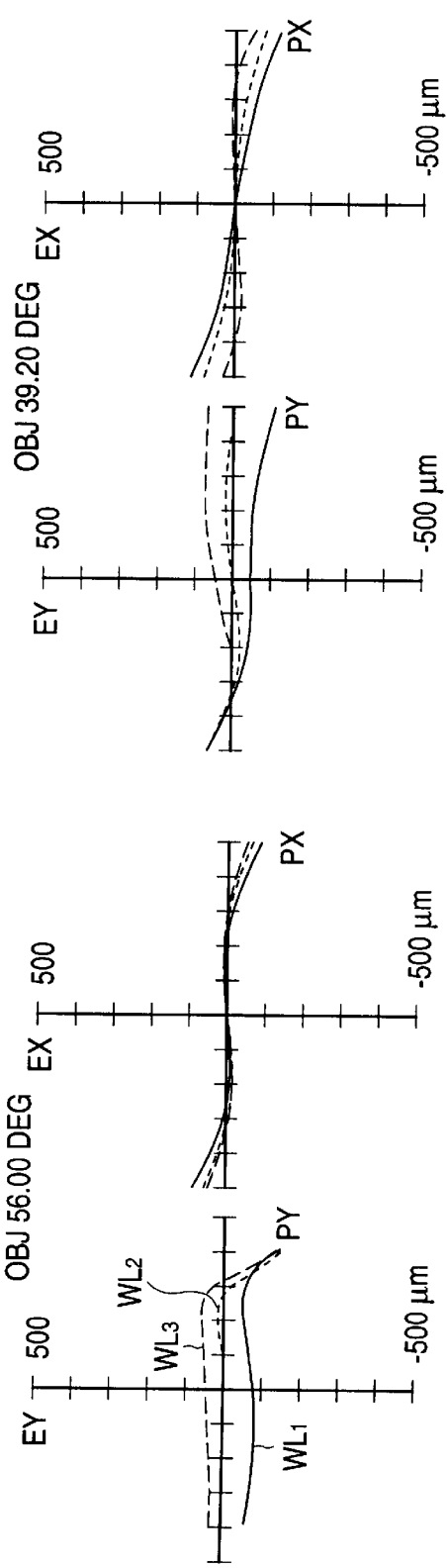

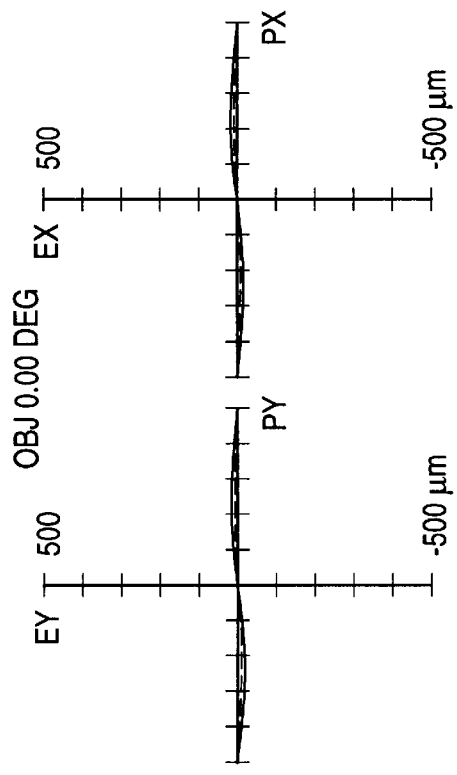
FIG. 17A OBJ 0.00 DEG
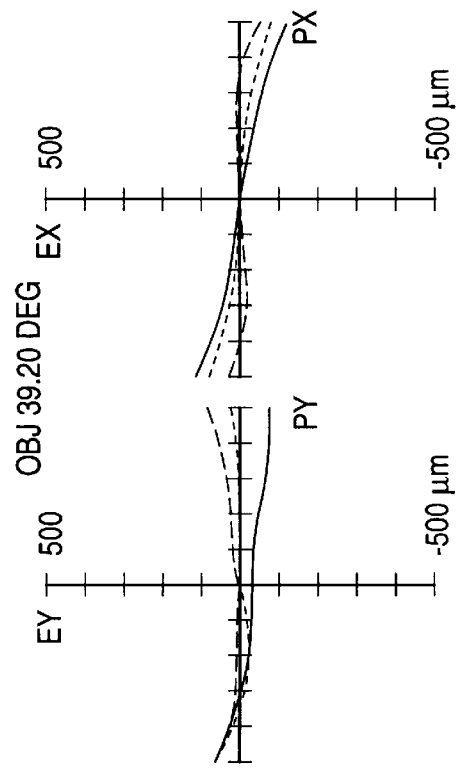
FIG. 17C OBJ 39.20 DEG
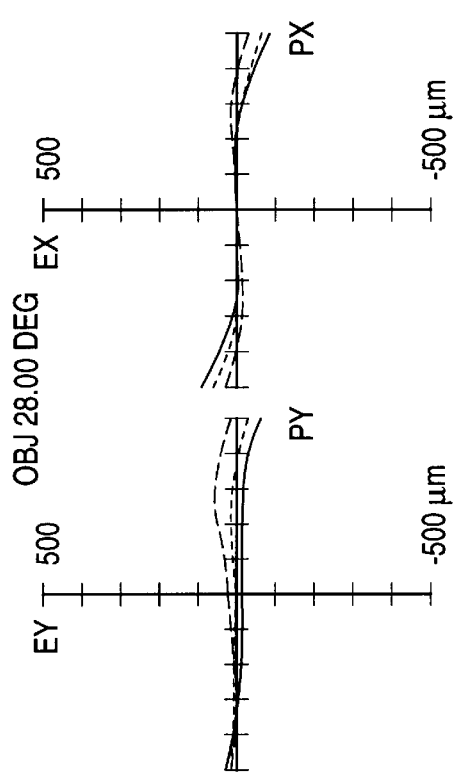
FIG. 17B OBJ 28.00 DEG
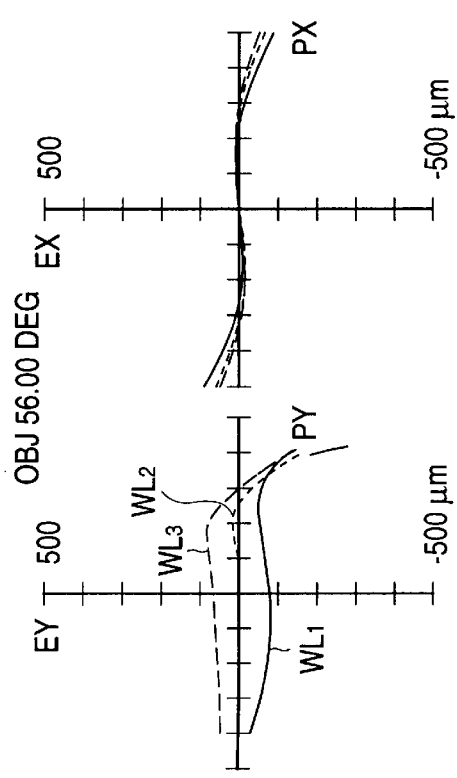
FIG. 17D OBJ 56.00 DEG

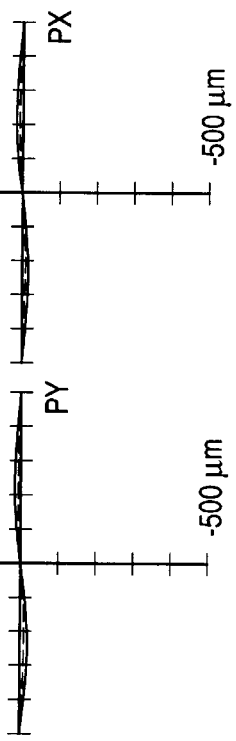
FIG. 18A OBJ 0.00 DEG
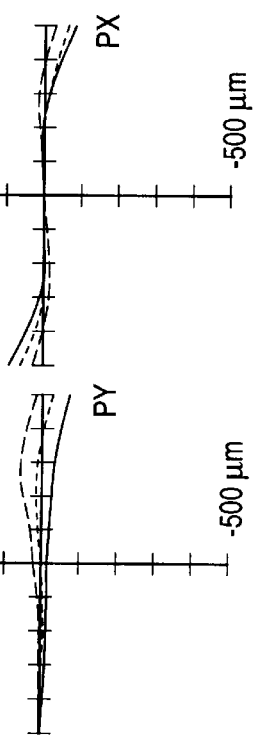
FIG. 18B OBJ 28.00 DEG
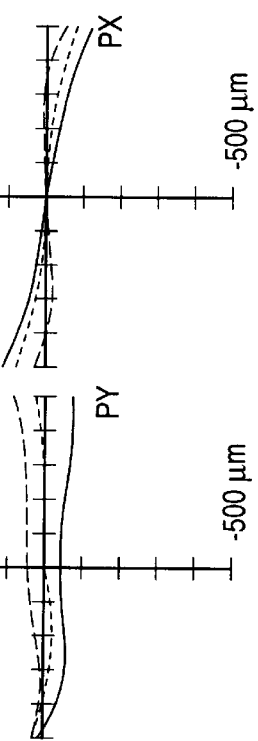
FIG. 18C OBJ 39.20 DEG
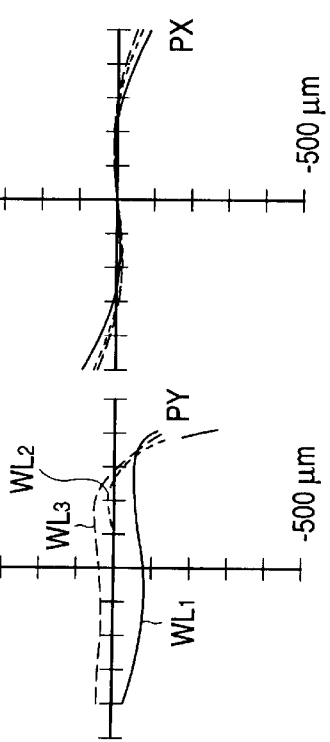
FIG. 18D OBJ 56.00 DEG

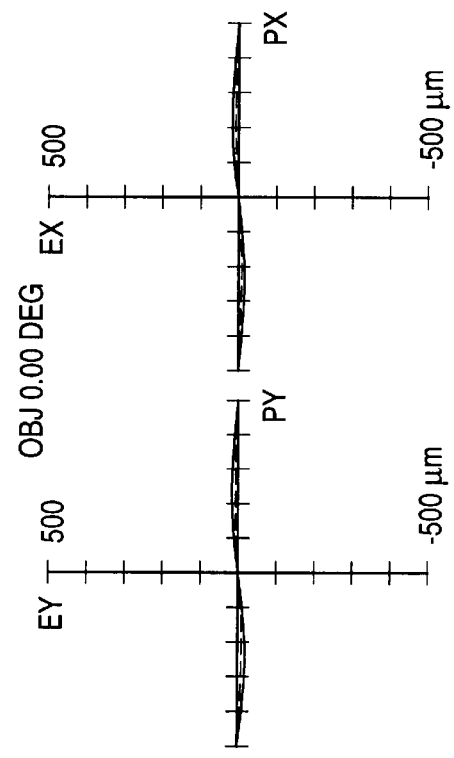
FIG. 20A  OBJ 0.00 DEG
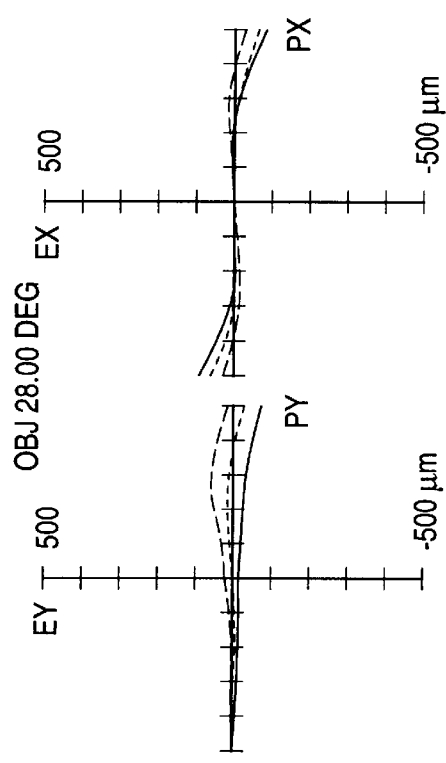
FIG. 20B  OBJ 28.00 DEG
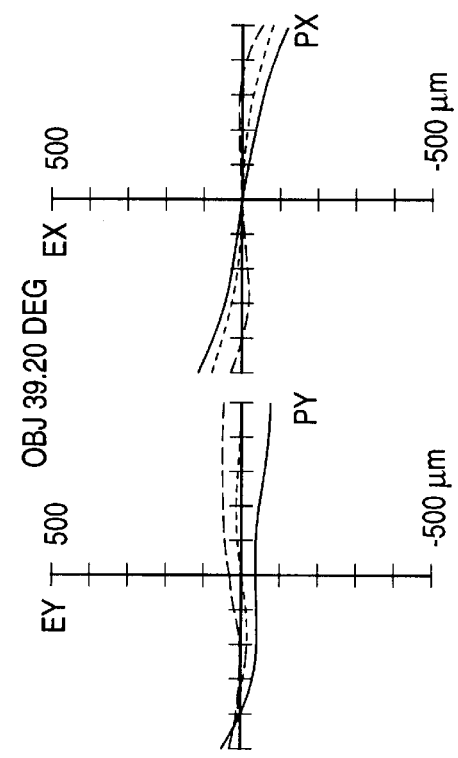
FIG. 20C  OBJ 39.20 DEG
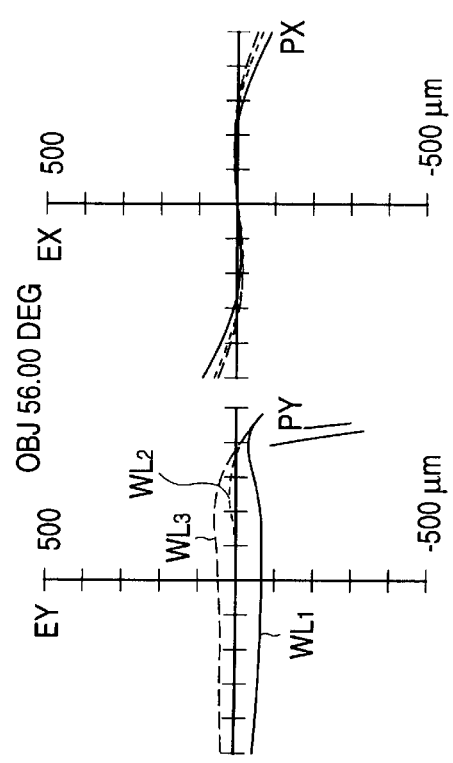
FIG. 20D  OBJ 56.00 DEG

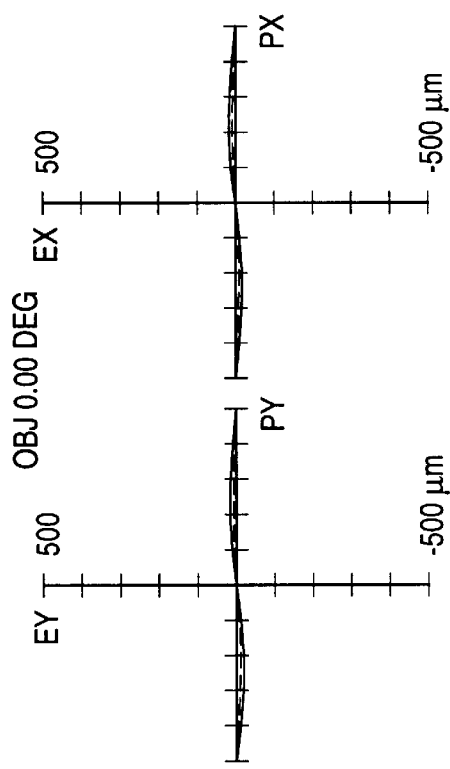
FIG. 21A OBJ 0.00 DEG
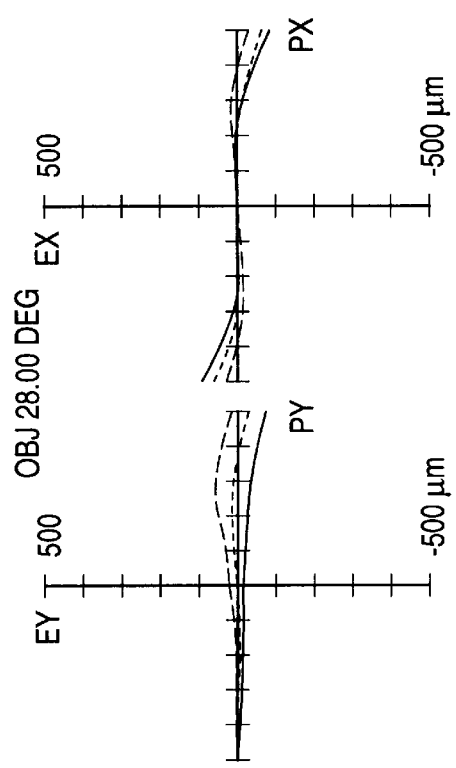
FIG. 21B OBJ 28.00 DEG
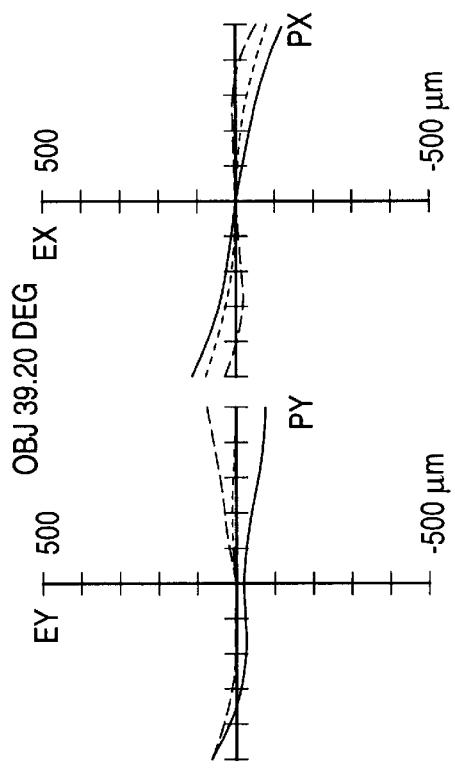
FIG. 21C OBJ 39.20 DEG
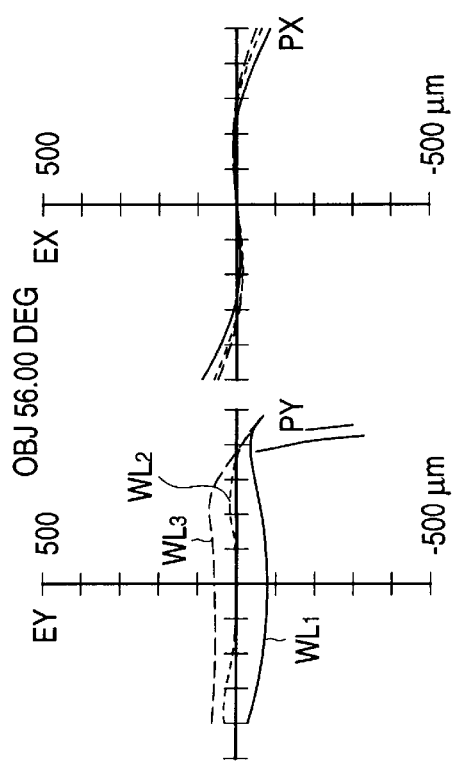
FIG. 21D OBJ 56.00 DEG

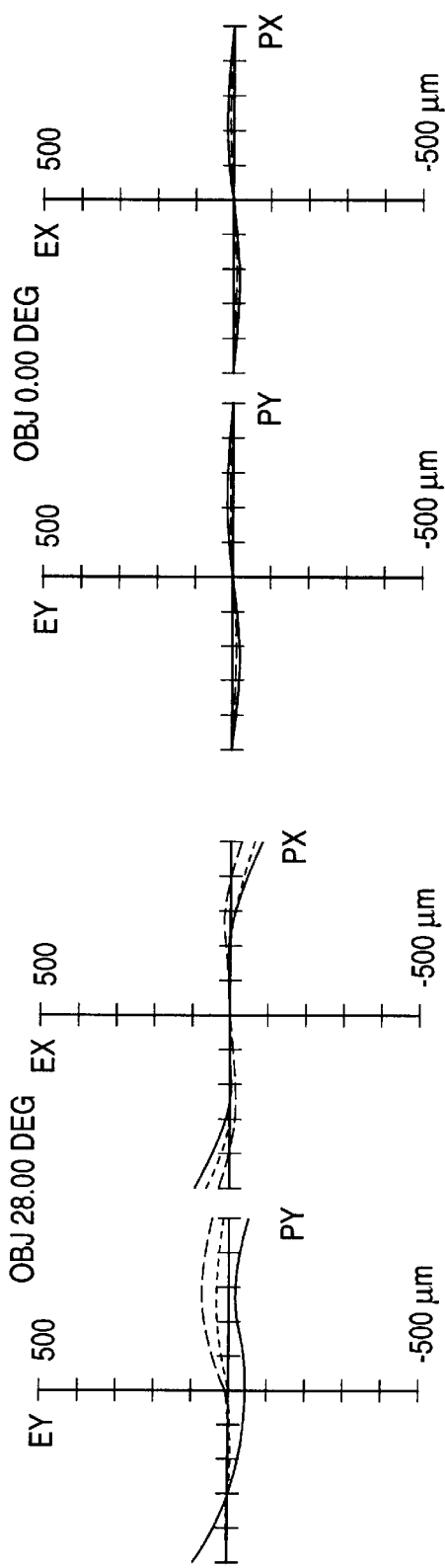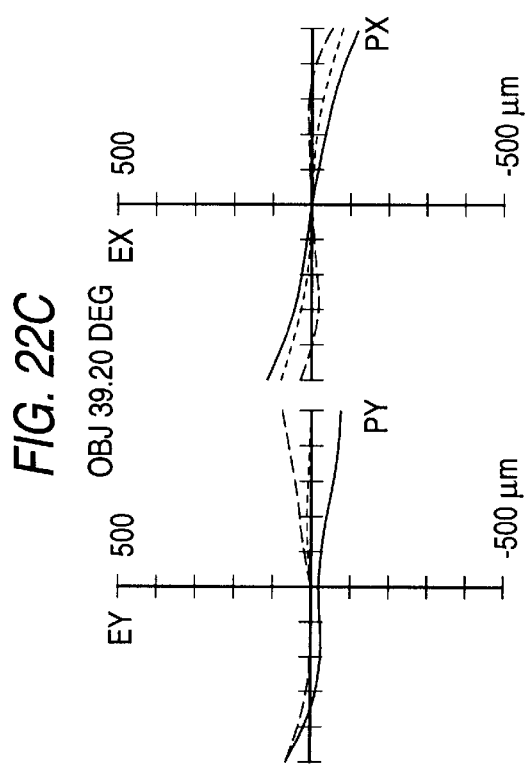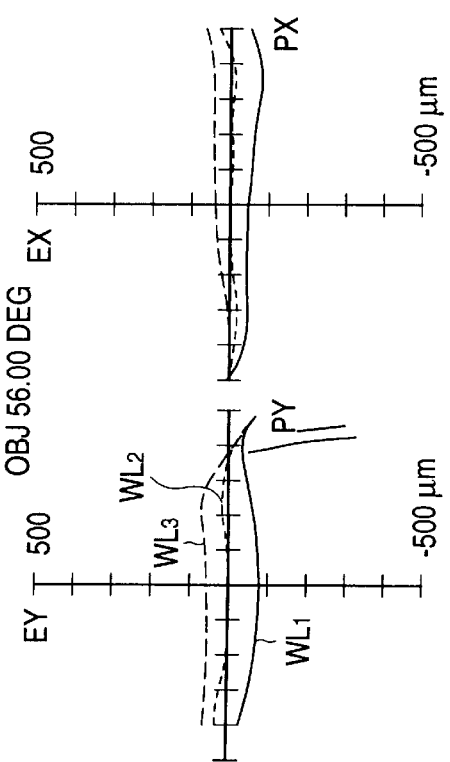

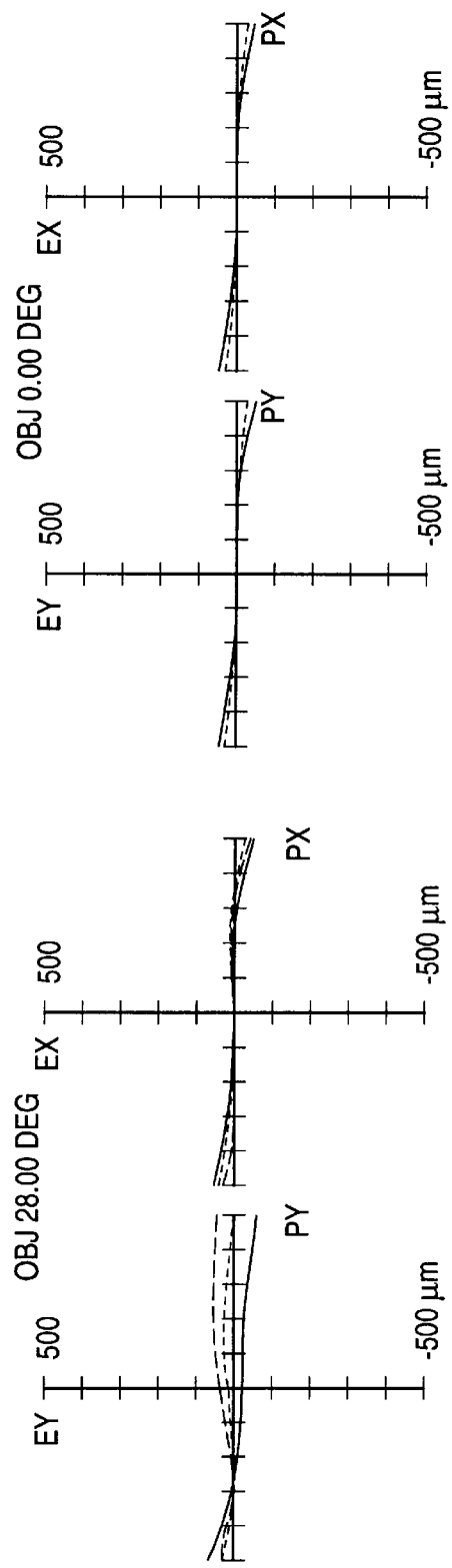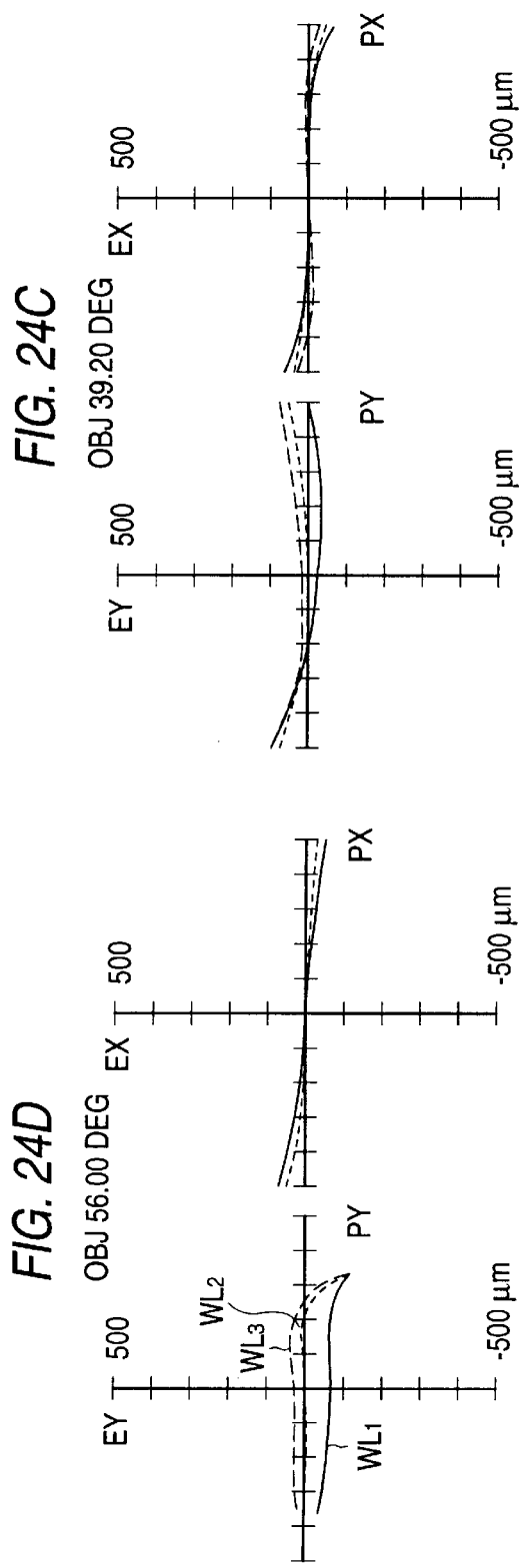

EYEPIECE OPTICAL SYSTEM AND EYEPIECE IMAGE DISPLAY DEVICE

BACKGROUND OF THE INVENTION

The present invention relates to an eyepiece optical system which can be applied to a head/face fitting visual display device, and an eyepiece image (video) display device equipped with it. The eyepiece optical system can be held at a user's head or face.

In recent years, for the purpose of "virtual reality" or personally enjoying a large-screen image, visual display devices of a helmet type or goggle type which are held at a user's head or face have become available. For example, one of them is to enlarge a image on a small display element such as a liquid display element, an EL display element, etc. and project it onto an eyeball through an eyepiece optical system such as a lens. The optical system for such an eyepiece visual display device is shown in FIG. 27. In FIG. 27, reference numeral 3 denotes a two-dimensional display element; 20 an eyepiece lens for enlarging and projecting it in the air; and 10 denotes eyeballs of an observer. In a conventional device, the enlarged virtual image of an original image formed on two-dimensional display devices 3 is formed and appreciated by an eyeball 10.

An example of the conventional technique for an eyepiece optical system is an eyepiece lens such as a microscope, binoculars, telescope, finder, etc. (the Examined Japanese Utility Model Application Publication No. Sho 40-9090, the Unexamined Japanese Patent Application Publication No. Sho 50-151163, the Unexamined Japanese Patent Application Publication No. Sho 51-120231, the Unexamined Japanese Patent Application Publication No. Sho 52-72242, and the Unexamined Japanese Patent Application Publication No. Hei 3-87709).

In order to improve the fitting capability of a head/face fitting visual display device, it is important to reduce the entire size of the device and the weight thereof. Assuring a large view angle is required to enhance the presence of a screen. It is not too much to say that the presence is critically dependent on the view angle provided. It is desired that a display view angle of 100° or more in an opposite angle is realized to give the presence such as an three-dimensional effect, intensity, immersing sense, etc. to an observer.

Further, a designed small pupil diameter at an eye point in a eyepiece system leads to a freedom of pupil so that slight deviation of the pupil from an optimum fitting state of the device results in a dark area on the periphery of the observed field of view, thus impairing the sense of reality. Therefore, it is required to reduce the F-number in an eyepiece optical system.

However, if the view angle in the eyepiece optical system is increased and the F-number is decreased, much aberration occurs because light passes the periphery of the optical system. This makes it difficult to correct the aberration in a compact configuration and lowers the resolution of a peripheral image under the influence of curvature of field. Particularly, it is difficult to correct the curvature of field since in the eyepiece lens having a smaller number of lenses, a positive lens is located at a high light-ray position and a negative lens is located at a low light-ray position to reduce the Petzval sum in distribution of positive and negative power.

The eyepiece optical system provided by the present invention satisfies the following conditions simultaneously:

(1) a large view angle of 110° or more in an opposite angle
(2) a small F number (large pupil diameter)
(3) a suitable eye relief (distance from the eye of an observer to the first surface of the eyepiece lens)
(4) good aberration correction On the other hand, although the conventional eyepiece lens assures a relatively large view angle of 50° to 70°, it cannot satisfy the above conditions indispensable to realize sufficient realism or presence and easiness in practical use in applications such as "virtual reality". Therefore, equipping an eyepiece image display device with the above conventional eyepiece lens cannot provide a large observation view angle, large freedom of pupil position and flat clear image to the periphery.

SUMMARY OF THE INVENTION

The present invention has been accomplished to solve the above problems.

The first object is to provide an eyepiece optical system which is aberration-corrected so as to provide a wide view angle in an opposite angle 110° or more for a single eye, a large freedom of pupil position by provision of a suitable pupil diameter and eye relief and a uniform and clear observed image to the periphery.

The second object of the present invention is to provide a compact and lightweight eyepiece image display device equipped with the above eyepiece optical system which can provide a wide view angle, excellent presence and clear visual display.

An optical eyepiece system according to the present invention comprises a first group of lenses G1 including a positive meniscus lens L1 having a concave face toward the eyeball, a both-face aspherical lens L2 and a both-face aspherical lens L3 having both convex faces in the vicinity of center and positive paraxial refractive power; and a second group of lenses G2 including a both-face aspherical lens L4 having both concave faces in the vicinity of center and negative paraxial refractive power, the first and second groups of lenses being arranged in order from the side of the eyeball, and projects a plane image on a two-dimensional display element onto an eyeball as an extended virtual image.

The both-face aspherical lens L2 has positive paraxial refraction power.

The both-face aspherical lens L2 has a meniscus shape having a convex shape toward the side of the eyeball in the vicinity of center and negative paraxial power.

The both-face aspherical lens L2 is curved so as to be concave toward the side of the eyeball on both faces on the periphery.

Assuming that the paraxial focal length of the G1 group and G2 group are f13 and f4, respectively, and the focal length of the entire system is f, they satisfy the conditions:

$$0.2 < f13/f < 0.45$$

$$-0.3 < f4/f < -0.09$$

Assuming that the paraxial focal length of the G1 group and G2 group are f13 and f4, respectively, they satisfy the conditions:

$$-2.9 < f13/f4 < -1.2$$

Assuming that the paraxial focal length of the G1 group and G2 group are f13 and f4, respectively, they satisfy the conditions:

$$-2.8 < f3/f4 < -1.2$$

Assuming that the Abbe's number average value of the glass material of the lenses L1, L2 and L3 is v13, and that of the glass material of the lens L4 is v4, they satisfy the conditions:

$$v13 > 40$$
$$v4 < 30$$

Assuming that the Abbe's number average values of the glass material of the lenses L3 and L4 are v3 and v4, respectively, they satisfy the conditions:

$$v3 > 35$$
$$v4 < 30$$

An eyepiece image display device according to the present invention comprises: one or two two-dimensional display elements for displaying an original image; and an eyepiece optical system for projecting a plane image on each two-dimensional display element onto an eyeball as an extended virtual image, the number of eyepiece optical system being equal to that of the two-dimensional display element, the eyepiece optical system comprising a first group of lenses G1 including a positive meniscus lens L1 having a concave face toward the eyeball, a both-face aspeherical lens L2 and a both-face aspherical lens L3 having both convex faces in the vicinity of center and positive paraxial refractive power; and a second group of lenses G2 including a both-face aspherical lens L4 having both concave faces in the vicinity of center and negative paraxial refractive power, the first and second groups of lenses being arranged in order from the side of the eyeball.

The both-face aspeherical lens L2 has positive paraxial refraction power.

The both-face aspherical lens L2 has a meniscus shape having a convex shape toward the side of the eyeball in the vicinity of center and negative paraxial power.

A preferable optical eyepiece system according to the present invention is a two-group four-lens system and comprises a first group of lenses G1 including a positive meniscus lens L1 having a concave face toward the eyeball, a both-face aspeherical lens L2 having positive paraxial refractive power and a both-face aspherical lens L3 having both convex faces in the vicinity of center and positive paraxial refractive power; and a second group of lenses G2 including a both-face aspherical lens L4 having both concave faces in the vicinity of center and negative paraxial refractive power, the first and second groups of lenses being arranged in order from the side of the eyeball, and projects a plane image on a two-dimensional display element onto an eyeball as an extended virtual image.

The both-face aspherical lens L2 is curved so as to be concave toward the side of the eyeball on both faces on the periphery.

Assuming that the paraxial focal length of the G1 group and G2 group are f13 and f4, respectively, and the focal length of the entire system is f, they satisfy the conditions:

$$0.25 < f13/f < 0.45$$
$$-0.3 < f4/f < -0.1$$

Assuming that the paraxial focal length of the G1 group and G2 group are f13 and f4, respectively, they satisfy the conditions:

$$-2.7 < f13/f4 < -1.2$$

Assuming that the paraxial focal length of the lenses L3 and L4 are f3 and f4, respectively, they satisfy the conditions:

$$-2.7 < f3/f4 < -1.2$$

Assuming that the Abbe's number average values of the glass materials of the lenses L1, L2 and L3 of the G1 group and that of the lens L4 of the group G2 are v13 and v4, they satisfy the conditions:

$$v13 > 40$$
$$v4 < 30$$

Assuming that the Abbe's number average values of the glass materials of the lenses L3 and L4 are v3 and v4, they satisfy the conditions:

$$v3 > 40$$
$$v4 < 30$$

Another preferable optical eyepiece system according to the present invention is a two-group four-lens system and comprises a first group of lenses G1 including a positive meniscus lens L1 having a concave face toward the eyeball, a both-face aspherical lens L2 having a meniscus shape with both faces in the vicinity of center being convex toward the side of eyeball and negative paraxial refractive power and a both-face aspherical lens L3 having both convex faces in the vicinity of center and positive paraxial refractive power; and a second group of lenses G2 including a both-face aspherical lens L4 having both concave faces in the vicinity of center and negative paraxial refractive power, the first and second groups of lenses being arranged in order from the side of the eyeball, and projects a plane image on a two-dimensional display element onto an eyeball as an extended virtual image.

The both-face aspherical lens L2 is curved so as to be concave toward the side of the eyeball on both faces in the periphery.

Assuming that the paraxial focal length of the G1 group and G2 group are fl3 and f4, respectively, and the focal length of the entire system is f, they satisfy the conditions:

$$0.2 < f13/f < 0.4$$

$$-0.18 < f4/f < -0.09$$

Assuming that the paraxial focal length of the G1 group and G2 group are fl3 and f4, respectively, they satisfy the conditions:

$$-2.9 < f13/f4 < -1.7$$

Assuming that the paraxial focal length of the lenses L3 and L4 are f3 and f4, respectively, they satisfy the conditions:

$$-2.8 < f3/f4 < -1.5$$

Assuming that the Abbe's number average values of the glass materials of the lenses L1, L2 and L3 of the G1 group and that of the lens L4 of the group G2 are v13 and v4, they satisfy the conditions:

$$v13 > 40$$

$$v4 < 30$$

Assuming that the Abbe's number average values of the glass materials of the lenses L3 and L4 are v3 and v4, they satisfy the conditions:

$$v3 > 40$$

$$v4 < 30$$

A preferable eyepiece image display device according to the present invention comprises: one or two two-dimensional display elements for displaying an original image; and an eyepiece optical system for projecting a plane image on each two-dimensional display element onto an eyeball as an extended virtual image, the number of eyepiece optical system being equal to that of the two-dimensional display element, the eyepiece optical system comprising a first group of lenses G1 including a positive meniscus lens L1 having a concave face toward the eyeball, a both-face aspherical lens L2 having positive paraxial refractive power and a both-face aspherical lens L3 having both convex faces in the vicinity of center and positive paraxial refractive power; and a second group of lenses G2 including a both-face aspherical lens L4 having both concave faces in the vicinity of center and negative paraxial refractive power, the first and second groups of lenses being arranged in order from the side of the eyeball.

Another preferable eyepiece image display device according to the present invention comprises: one or two two-dimensional display elements for displaying an original image; and an eyepiece optical system for projecting a plane image on each two-dimensional display element onto an eyeball as an extended virtual image, the number of eyepiece optical system being equal to that of the two-dimension display element, the eyepiece optical system comprising a first group of lenses G1 including a positive meniscus lens L1 having a concave face toward the eyeball, a both-face aspeherical lens L2 having a meniscus shape with both faces in the vicinity of center being convex toward the side of eyeball and negative paraxial refractive power and a both-face aspherical lens L3 having both convex faces in the vicinity of center and positive paraxial refractive power; and a second group of lenses G2 including a both-face aspherical lens L4 having both concave faces in the vicinity of center and negative paraxial refractive power, the first and second groups of lenses being arranged in order from the side of the eyeball.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 13A to 13D are transverse aberration views of an eyepiece optical system according to the first numerical embodiment of the present invention.

FIGS. 17A to 17D are transverse aberration views of an eyepiece optical system according to the fifth numerical embodiment of the present invention.

FIGS. 18A to 18D are transverse aberration views of an eyepiece optical system according to the sixth numerical embodiment of the present invention.

FIGS. 20A to 20D are transverse aberration views of an eyepiece optical system according to the eighth numerical embodiment of the present invention.

FIGS. 21A to 21D are transverse aberration views of an eyepiece optical system according to the ninth numerical embodiment of the present invention.

FIGS. 22A to 22D are transverse aberration views of an eyepiece optical system according to the tenth numerical embodiment of the present invention.

FIGS. 24A to 24D are transverse aberration views of an eyepiece optical system according to the twelfth numerical embodiment of the present invention.

DETAILED DESCRIPTION OF THE PREFERRED EMBODIMENTS

Figure 1:
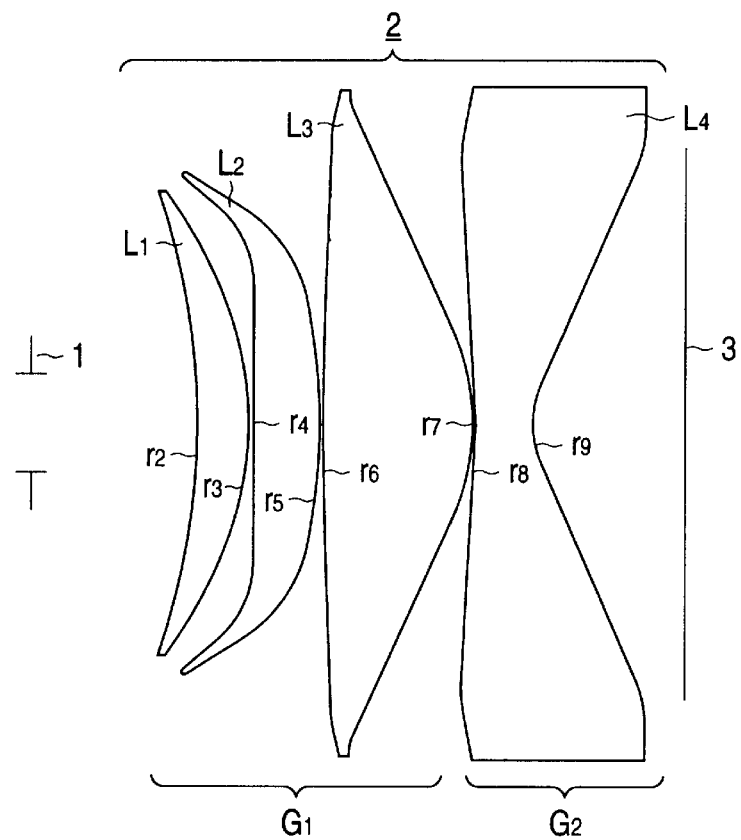
FIG. 1 is a sectional view of an eyepiece optical system according to the first numerical embodiment of the present invention.
Figure 2:
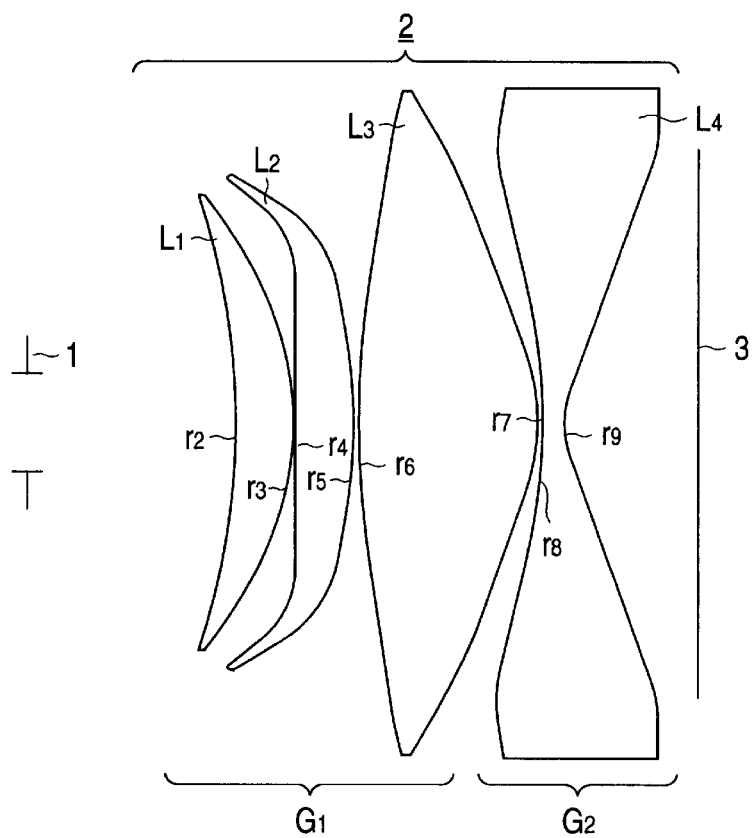
FIG. 2 is a sectional view of an eyepiece optical system according to the second numerical embodiment of the present invention.
Figure 3:
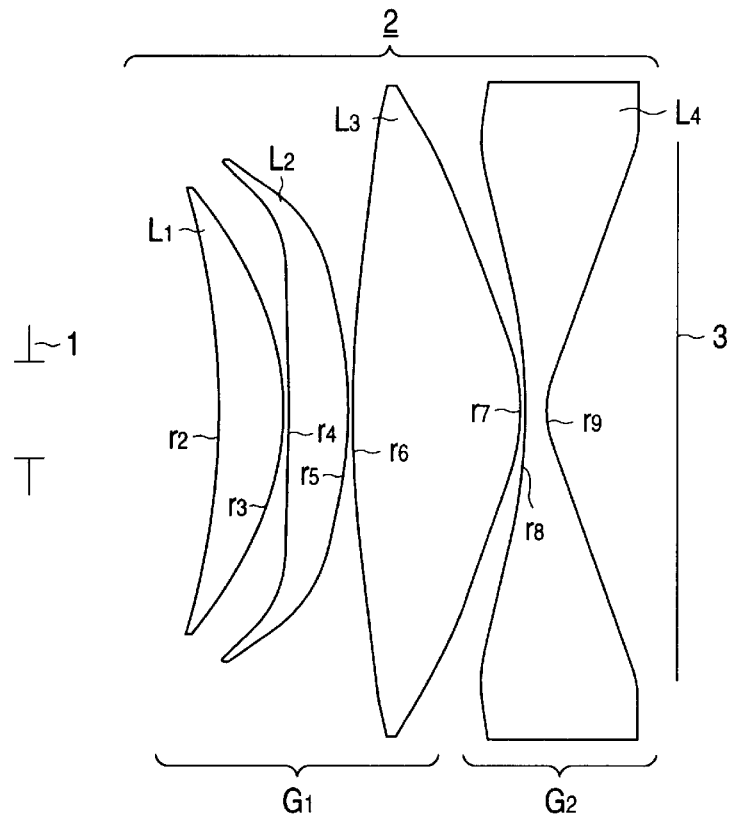
FIG. 3 is a sectional view of an eyepiece optical system according to the third numerical embodiment of the present invention.
Figure 4:
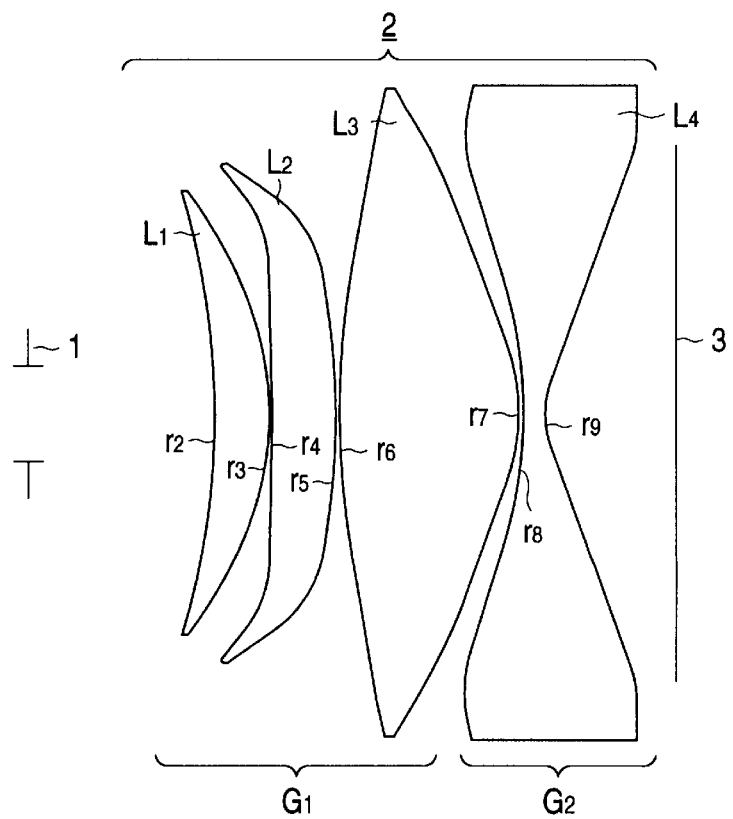
FIG. 4 is a sectional view of an eyepiece optical system according to the fourth numerical embodiment of the present invention.
Figure 5:
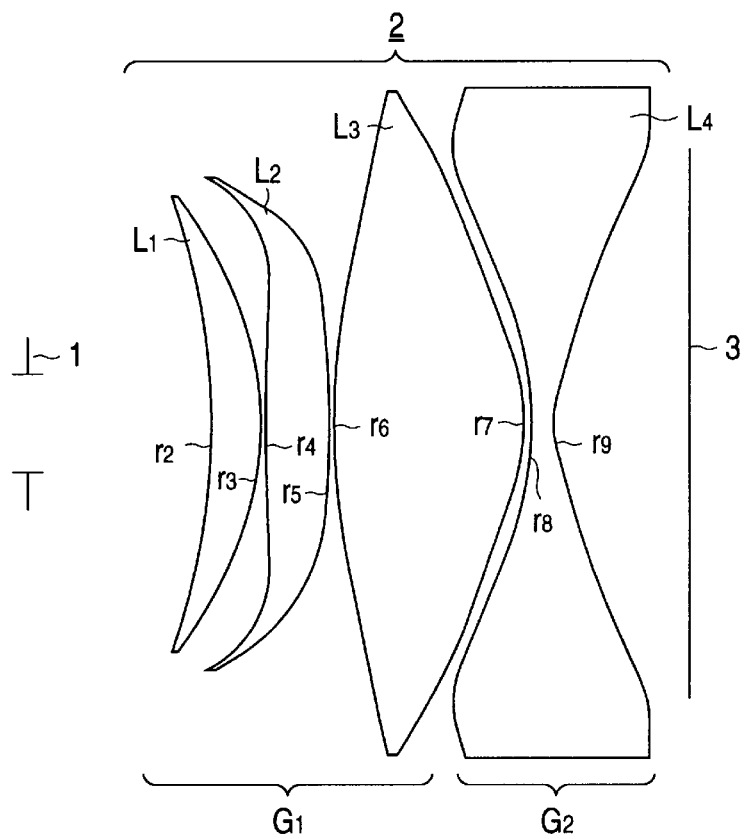
FIG. 5 is a sectional view of an eyepiece optical system according to the fifth numerical embodiment of the present invention.
Figure 6:
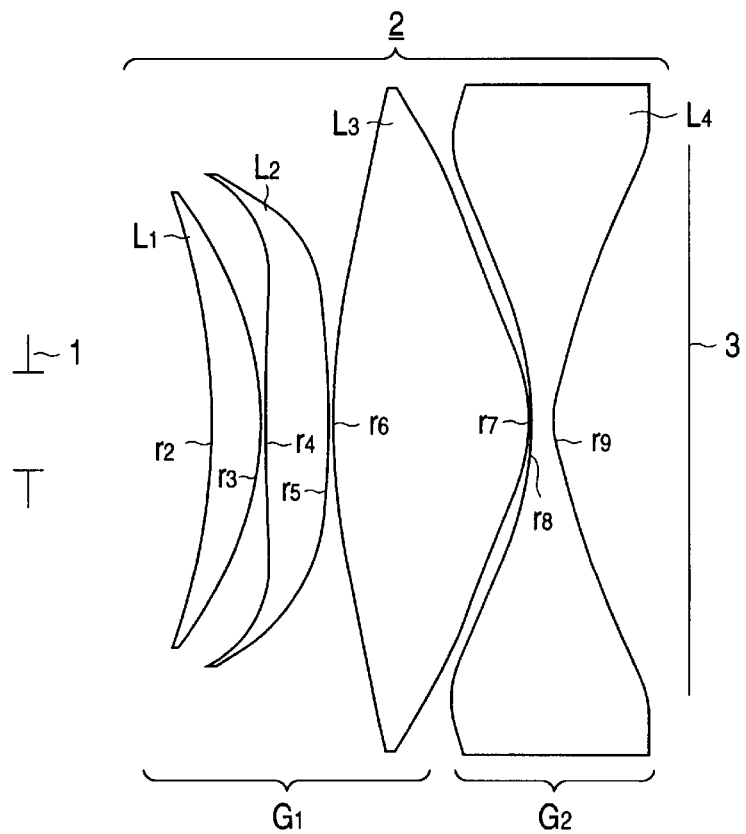
FIG. 6 is a sectional view of an eyepiece optical system according to the sixth numerical embodiment of the present invention.
Figure 7:
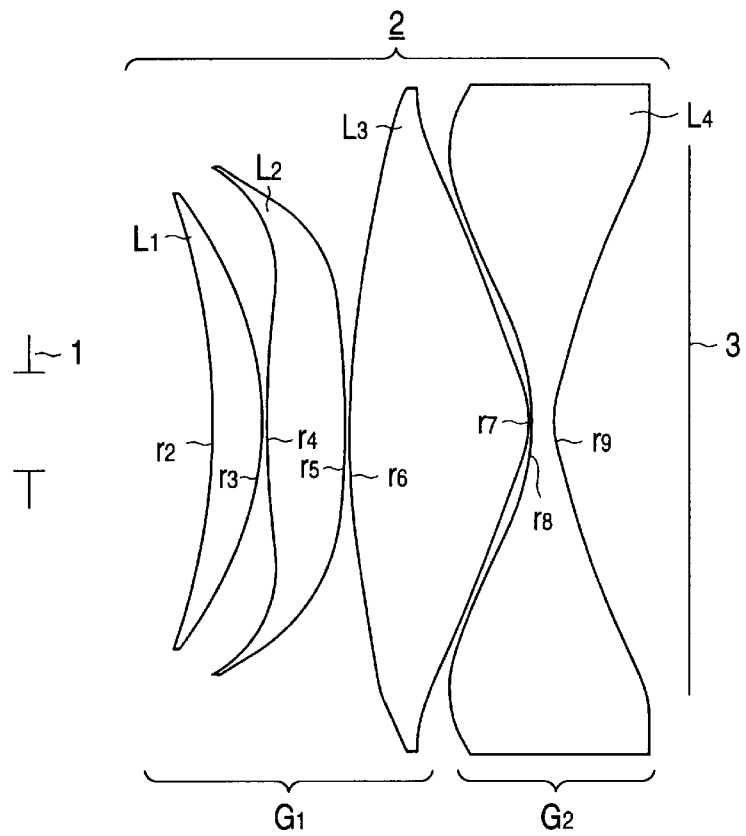
FIG. 7 is a sectional view of an eyepiece optical system according to the seventh numerical embodiment of the present invention.
Figure 8:
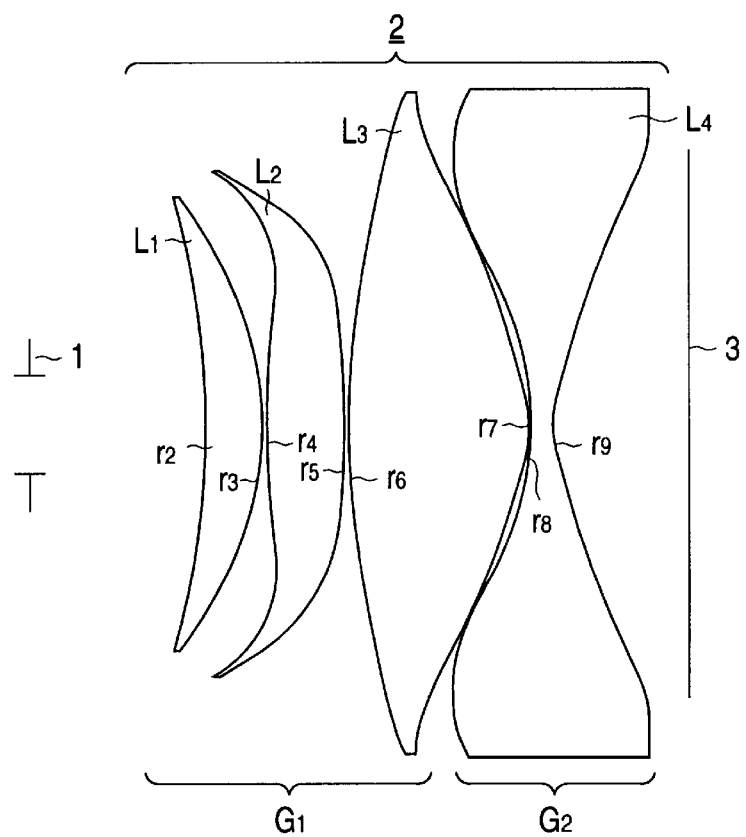
FIG. 8 is a sectional view of an eyepiece optical system according to the eighth numerical embodiment of the present invention.
Figure 9:
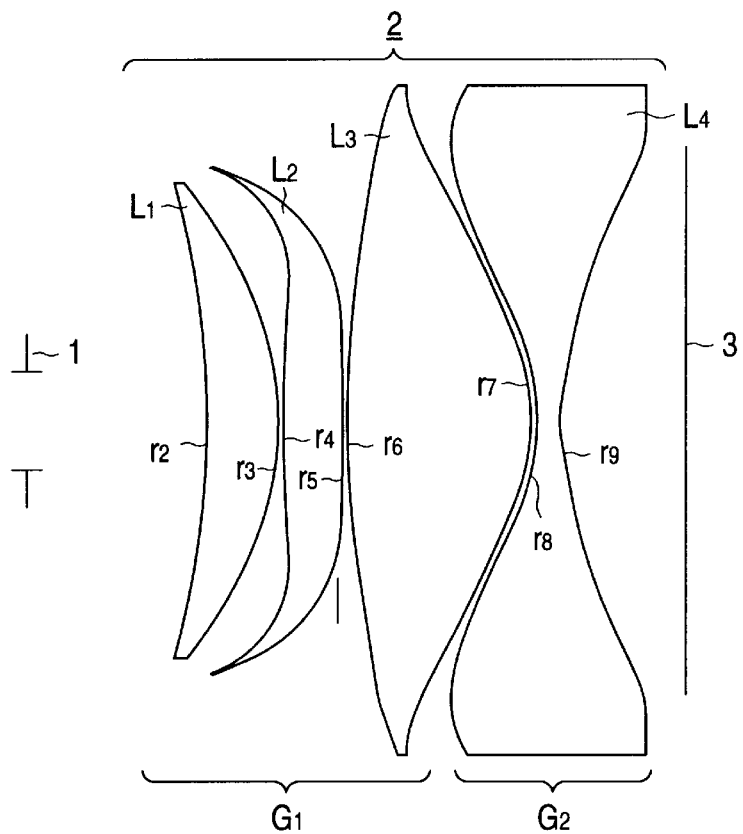
FIG. 9 is a sectional view of an eyepiece optical system according to the ninth numerical embodiment of the present invention.
Figure 10:
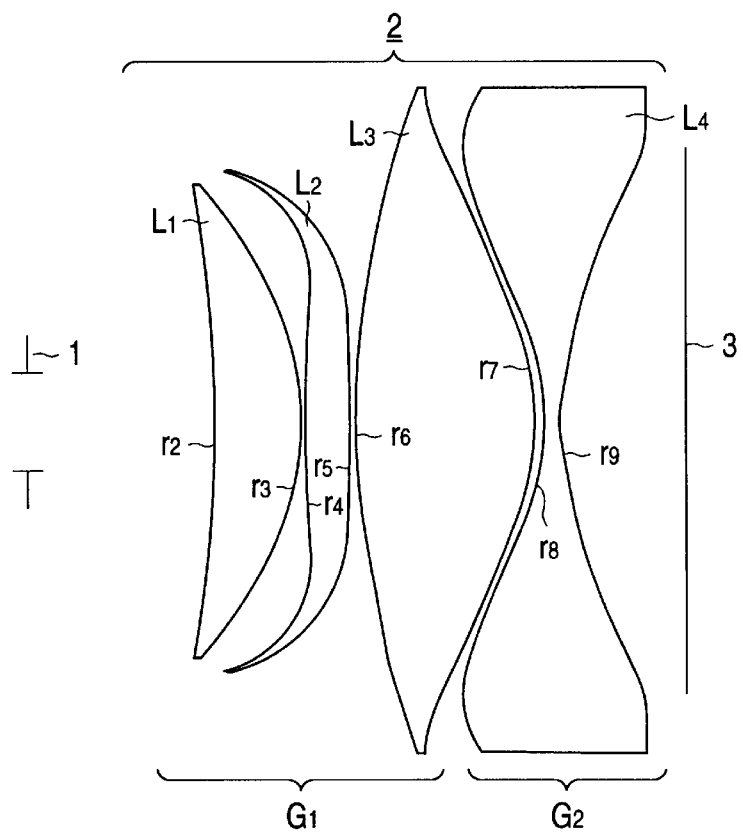
FIG. 10 is a sectional view of an eyepiece optical system according to the tenth numerical embodiment of the present invention.
Figure 11:
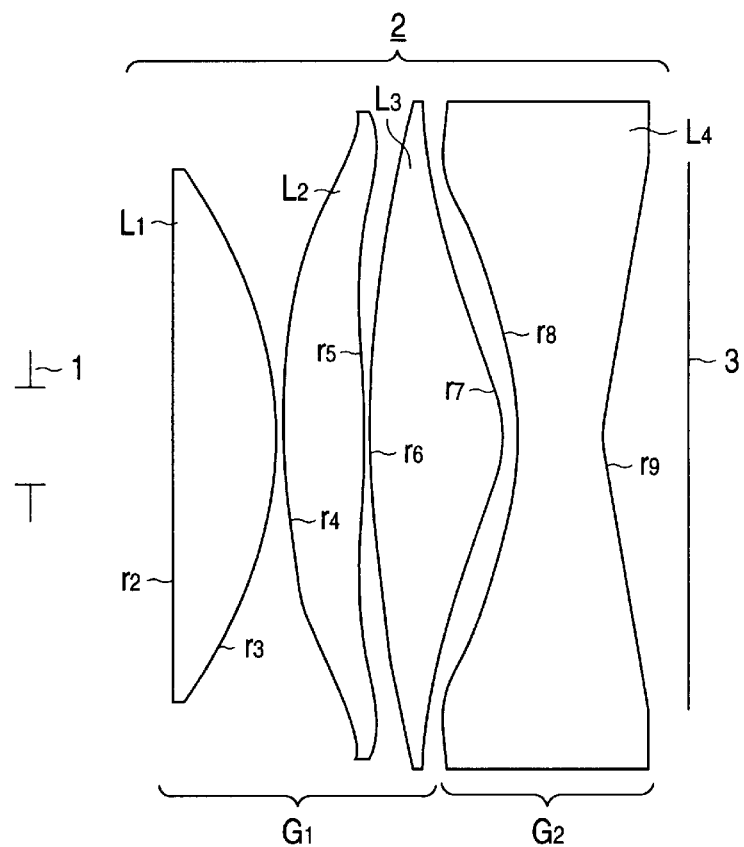
FIG. 11 is a sectional view of an eyepiece optical system according to the eleventh numerical embodiment of the present invention.
Figure 12:
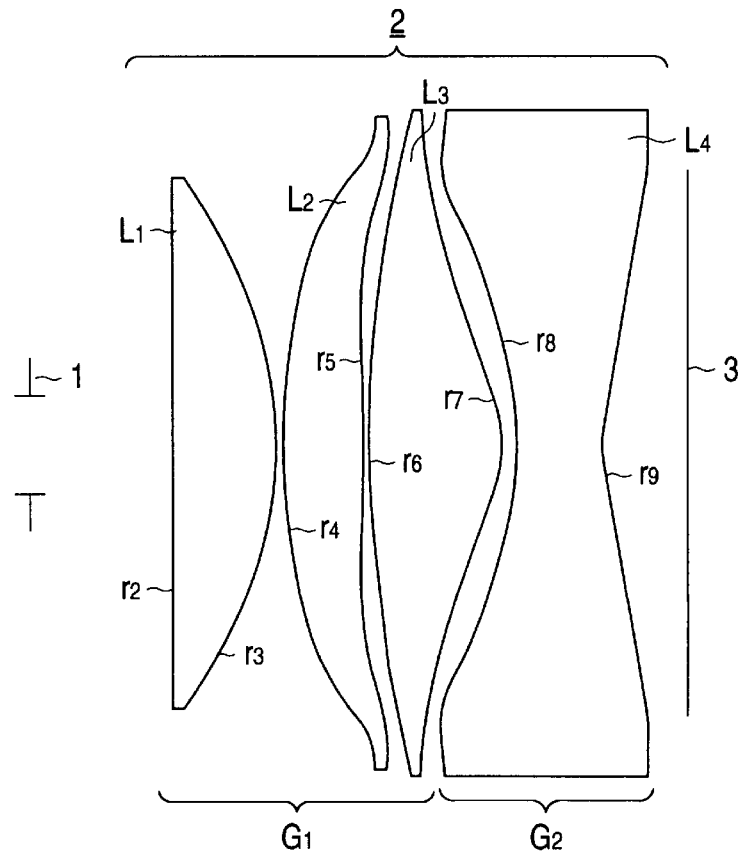
FIG. 12 is a sectional view of an eyepiece optical system according to the twelfth numerical embodiment of the present invention.
Figure 14A:
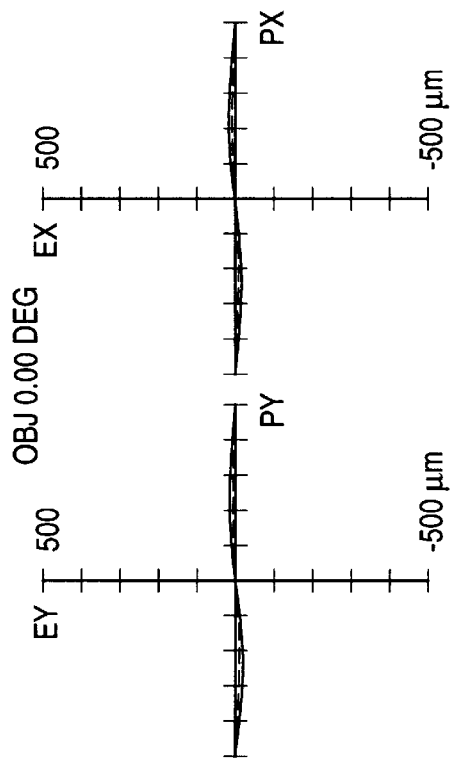
FIGS. 14A to 14D are transverse aberration views of an eyepiece optical system according to the second numerical embodiment of the present invention.
Figure 14B:
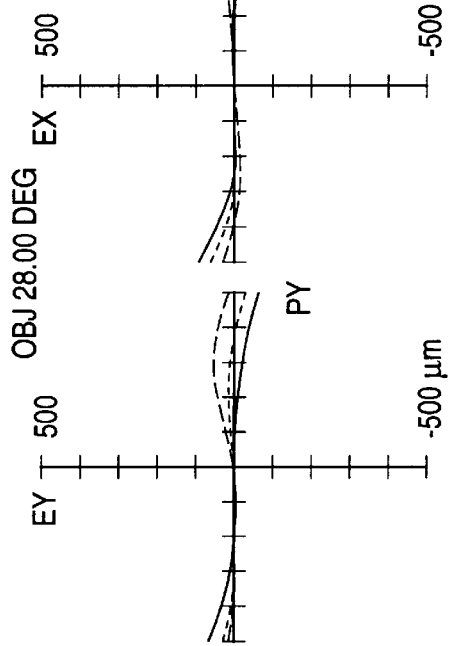
Figure 14C:
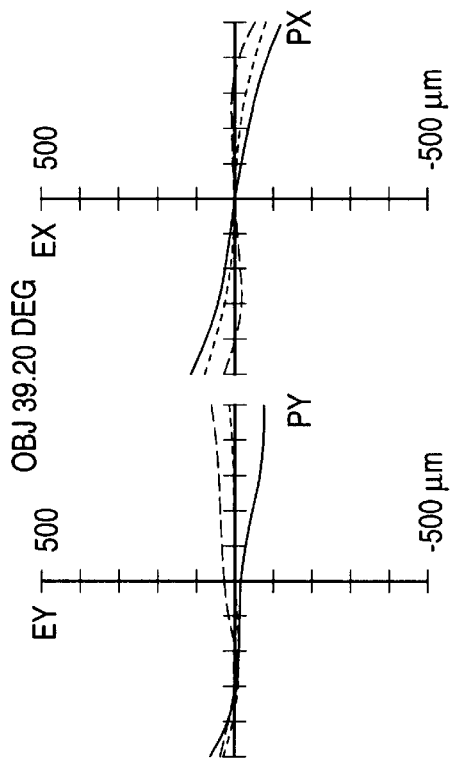
Figure 14D:
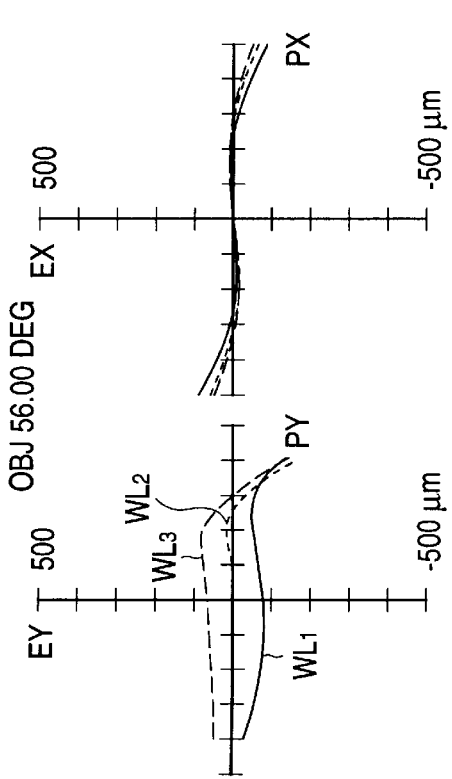
Figure 15A:
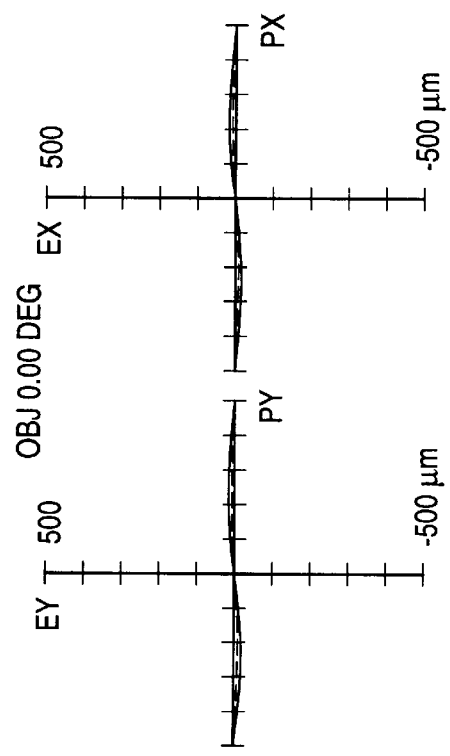
FIGS. 15A to 15D are transverse aberration views of an eyepiece optical system according to the third numerical embodiment of the present invention.
Figure 15B:
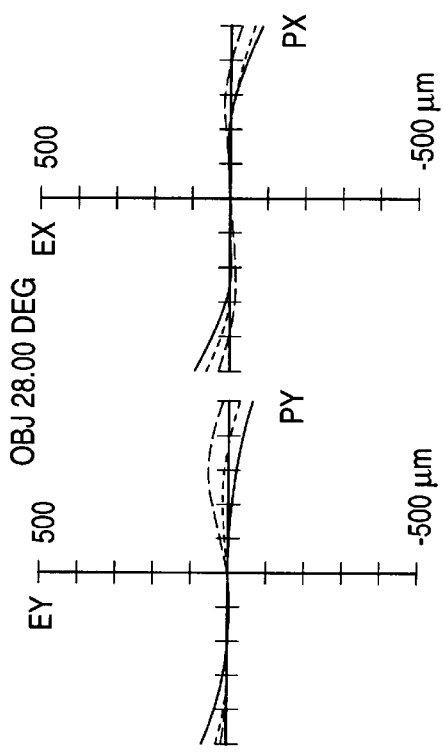
Figure 15C:
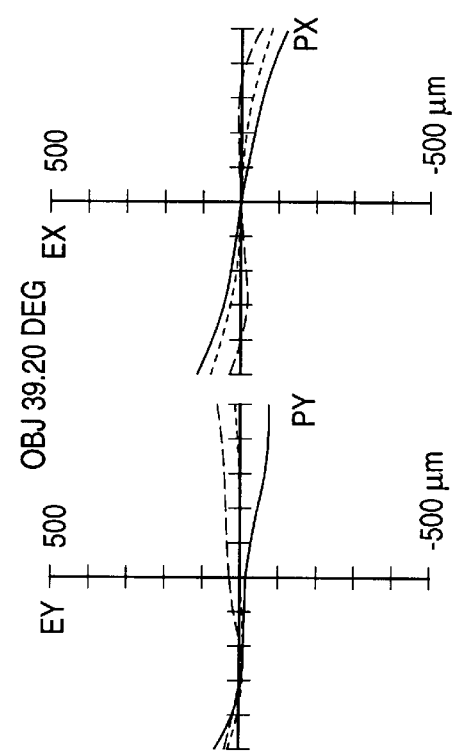
Figure 15D:
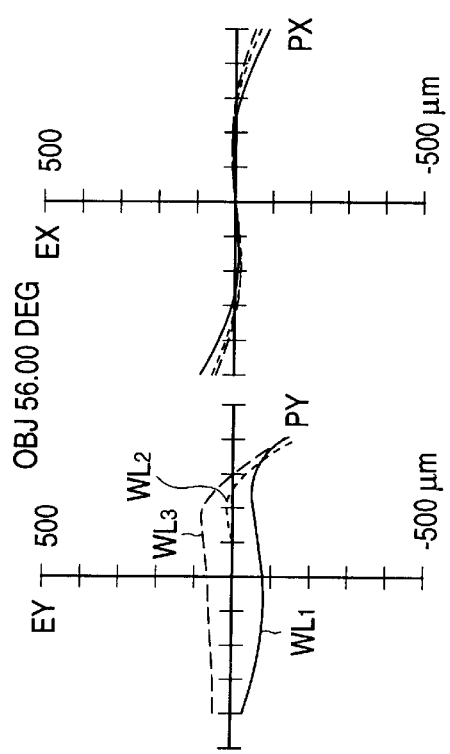
Figure 16A:
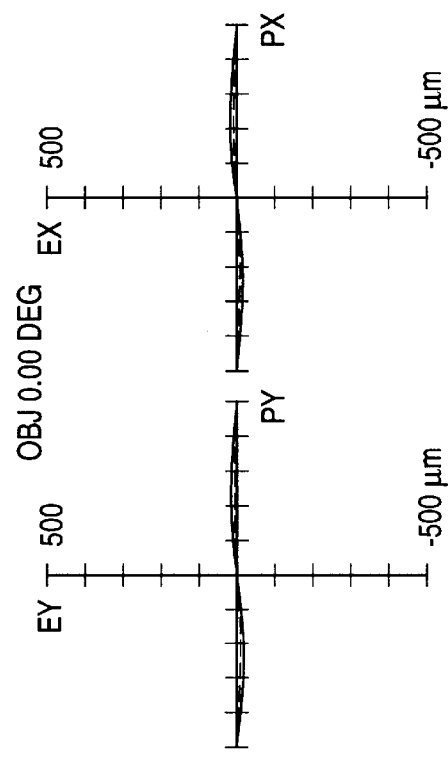
FIGS. 16A to 16D are transverse aberration views of an eyepiece optical system according to the fourth numerical embodiment of the present invention.
Figure 16B:
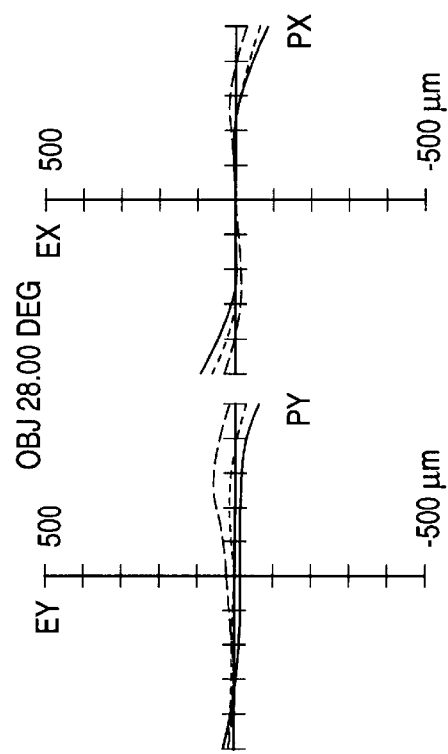
Figure 16C:
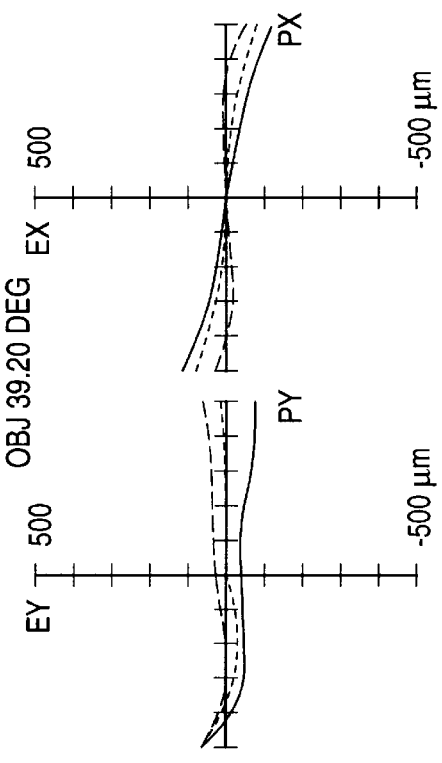
Figure 16D:
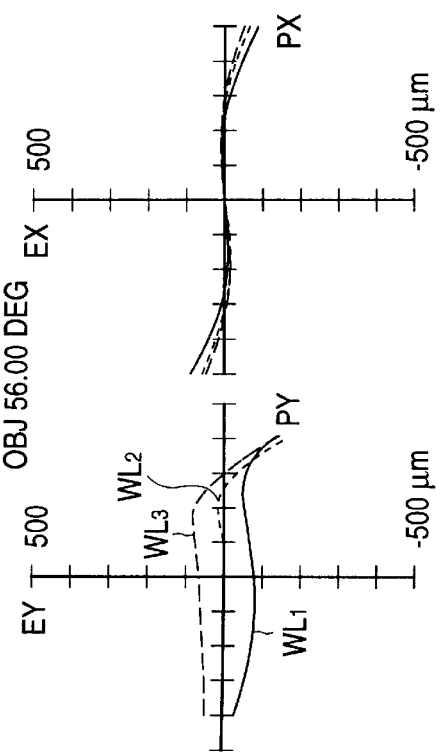
Figure 19A:
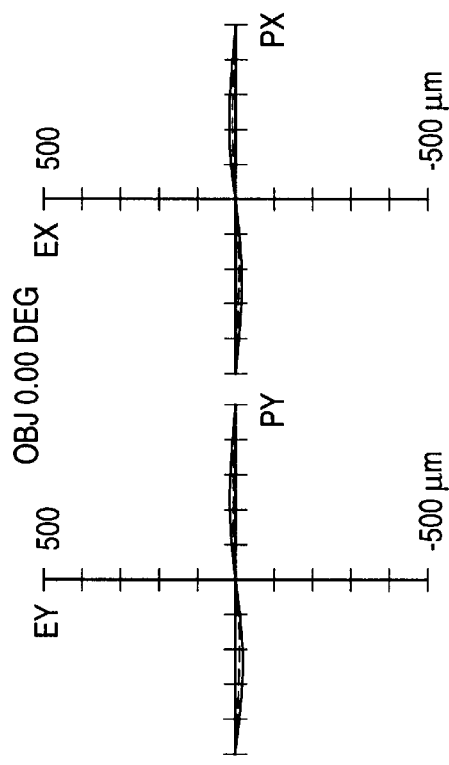
FIGS. 19A to 19D are transverse aberration views of an eyepiece optical system according to the seventh numerical embodiment of the present invention.
Figure 19C:
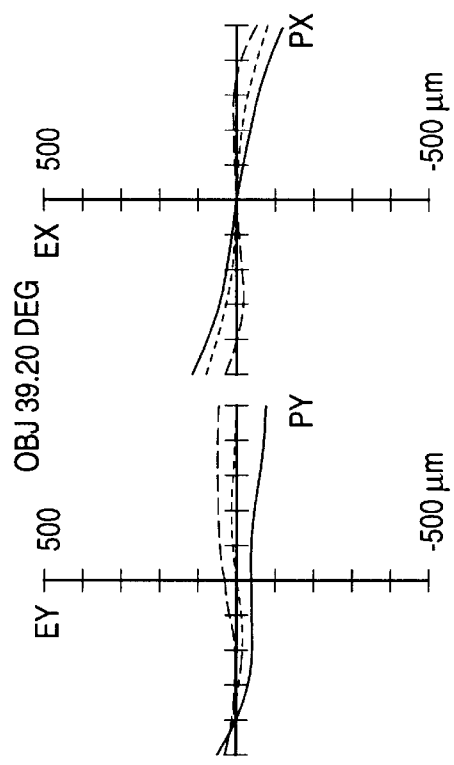
Figure 19B:
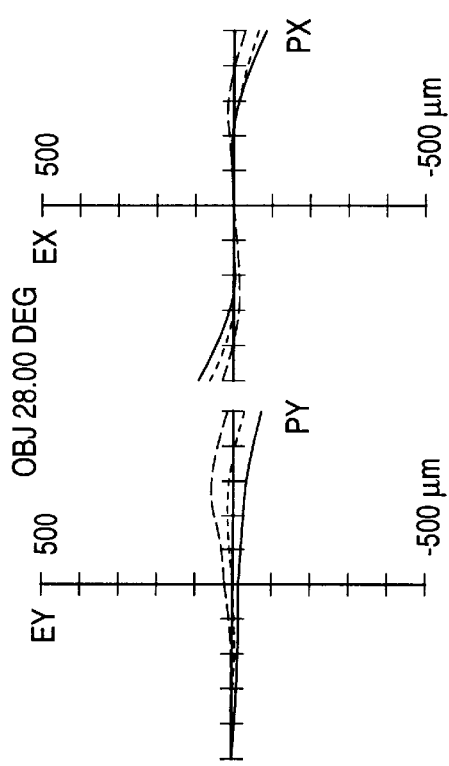
Figure 19D:
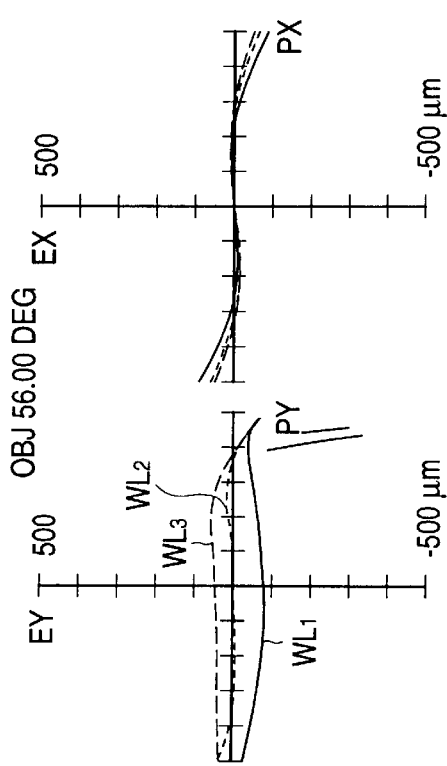
Figure 23A:
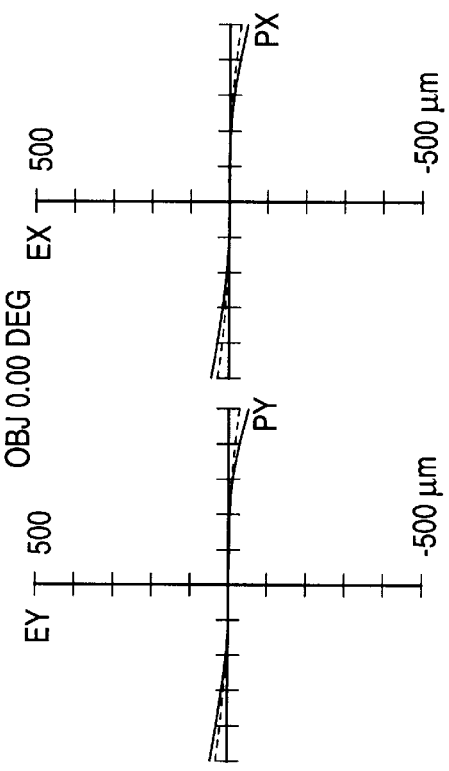
FIGS. 23A to 23D are transverse aberration views of an eyepiece optical system according to the eleventh numerical embodiment of the present invention.
Figure 23B:
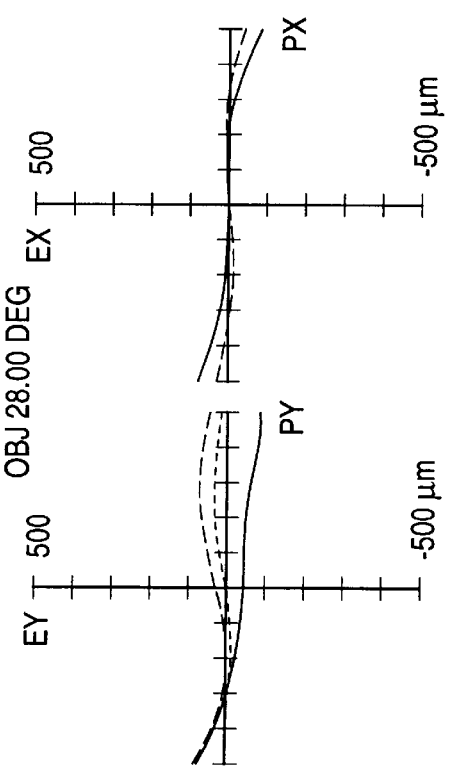
Figure 23C:
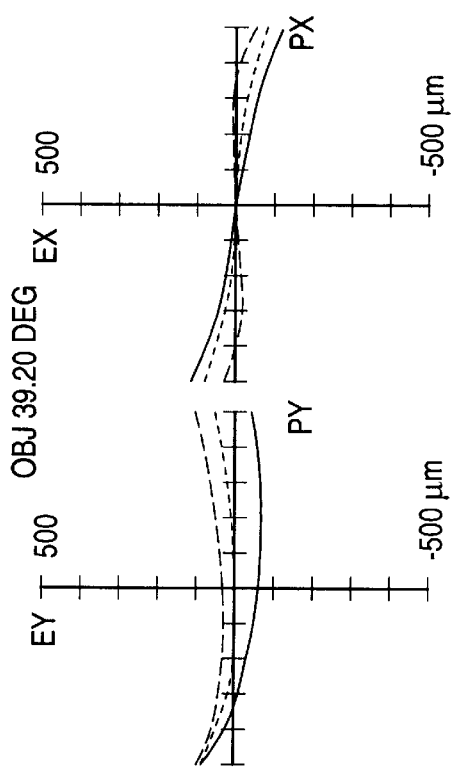
Figure 23D:
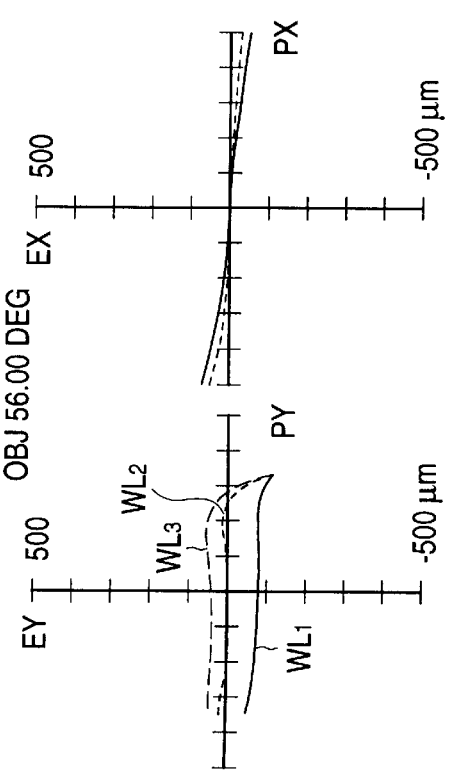

Now referring to the drawings, an explanation will be given of the first to twelfth embodiments of an eyepiece optical system used in an eyepiece image display device according to the present invention. FIGS. 1 to 12 are sectional views of eyepiece optical systems according to the first to twelfth embodiments. FIGS. 1 to 12 correspond to numerical embodiments described later. Since the respective sections of the first to twelfth embodiments have similar configurations in their views, FIG. 1 showing the first embodiment as a typical example will be explained and the configuration of each of the second embodiment to twelfth embodiment will not be explained.

Embodiment 1

In FIG. 1, reference numeral 1 denotes an incident pupil of an eyepiece optical system which corresponds to the pupil of the eyeball of an observer; 2 an eyepiece optical system according to the present invention; and 3 an image display screen of a small two-dimensional display device (element) such as an LCD (Liquid Crystal Display), ELD (Electroluminescent Display), FED (Field Emission Display), CRT (Cathode Ray Tube), etc. for displaying an original image.

The eyepiece optical system 2 includes a first group of lenses G1 and a second group of lenses G2 arranged in order from the side of the incident pupil 1. The first group includes a positive meniscus lens L1 having a concave face toward the incident pupil 1, both-face aspherical lens L2 having positive paraxial refractive power and a both-face aspherical lens L3 having both convex faces in the vicinity of center and positive paraxial refractive power, and has positive refractive power. The second group includes a both-face aspherical lens L4 having both concave faces in the vicinity of center and negative paraxial refractive power, and has negative refractive power.

In order to reduce color aberration, the positive lenses L1, L2 and L3 constituting the G1 group are made of a low dispersion glass material and the negative lens L4 is made of a high dispersion glass material. Assuming that the Abbe's number average value of the glass material of the lenses L1, L2 and L3 is v13, and that of the glass material of the lens L4 is v4, v13 and v4 satisfy the following inequalities (1) and (2) simultaneously to correct color aberration desirably.

$$v13 > 40 \quad (1)$$

$$v4 < 30 \quad (2)$$

Since the refractive power of the group G1 is dominated by L3, assuming that the Abbe's number of the glass materials constituting L3 and L4 are v3 and v4, v3 and v4 must satisfy the following inequalities (3) and (4) to correct the color aberration.

$$v3 > 40 \quad (3)$$

$$v4 < 30 \quad (4)$$

The lens L2 is constituted by a both-face aspherical lens having positive power in the vicinity of the center. L2 is curved so as to be concave toward the pupil 1 on both sides on the periphery, thereby providing a small incident angle for a peripheral light ray having a large tilt. Therefore, as seen from the table of the first to tenth numerical embodiments, the sixth order aspherical coefficient $[A6]S_4$ on the fourth face and the fourth order aspherical coefficient $[A4]_{S5}$ on the fifth face satisfy the conditions of the following inequalities (5) and (6).

$$-1.3e{-}6 < [A6]_{S4} < -2e{-}7 \tag{5}$$

$$-1.4e{-}4 < [A4]_{S5} < +7e{-}5 \tag{6}$$

Above the upper limit of inequality (5), the periphery of the fourth face will be curved toward the side opposite to the incident pupil 1, whereas below the lower limit of inequality (5), it will be curved excessively toward the incident pupil 1, thus losing utility. Above the upper limit of inequality (6), the periphery of the fifth face will be curved toward the side opposite to the incident pupil 1, whereas below the lower limit of inequality (6), it will be curved excessively toward the incident pupil 1.

Assuming that the paraxial focal length of the G1 group (lens L1 to L3) and G2 group (lens L4) are f13 and f4, respectively, and the focal length of the entire system is f, they satisfy the conditions of the following conditions.

$$0.25 < f13/f < 0.45 \tag{7}$$

$$-0.3 < f4/f < -0.1 \tag{8}$$

The inequalities (7) and (8) define the power distribution of the eyepiece optical system according to the present invention. Above the upper limit of inequality (7), the positive power of the G1 group becomes low, thus excessively correcting the paraxial color aberration. Below the lower limit of inequality (7), the positive power of the G1 group becomes high. This makes it impossible to assure a suitable back focal length and hence difficult to arrange the display element. This also results in shortage of correction in the paraxial color aberration, and makes it difficult to correct the high order off-axis aberration. Above the upper limit of inequality (8), the negative power of the G2 group becomes high. This results in excessive correction of the paraxial color aberration, and provides a strict condition to the accuracy of creating and arranging the lens L4, thus losing the utility. This also makes it difficult to correct the high order off-axis aberration. Below the lower limit of inequality (8), the negative power of the G2 group becomes low. This makes it impossible to assure a suitable back focal length and hence difficult to arrange the display element. This also results in shortage of correction in the paraxial color aberration.

Assuming that the paraxial focal length of the G1 group and G2 group are f13 and f4, respectively, they satisfy the following inequality (9).

$$-2.7 < f13/f4 < -1.2 \tag{9}$$

Inequality (9) limits the range of the ratio between the respective focal length of the G1 group and G2 group. Below the lower limit of inequality (9), the negative power of the G2 group becomes relatively high. This makes it difficult to correct the high order off-axis aberration, which is generated in the G2 group (lens L4), and results in excessive correction of the paraxial color aberration. Above inequality (9), the positive power of the G1 group becomes high relatively. This makes it difficult to assure the back focal length of the entire system and to correct the high order paraxial color aberration which is generated in the G1 group.

Assuming that the paraxial focal length of the lenses L3 and L4 are f3 and f4, respectively, they satisfy the following inequality (10).

$$-2.7 < f3/f4 < -1.2 \tag{10}$$

Inequality (10) limits the range of the ratio between the focal length of the lens L3 dominating the power of the G1 group and the lens L4 constituting the G2 group. Below the lower limit of inequality (10), the negative power of the lens L4 becomes high relatively. This makes it difficult to correct the high order off-axis aberration which is generated in the lens L4 and also results in excessive correction of the paraxial color aberration. This also provides a strict condition to the accuracy of creating and arranging the lens L4. Above the upper limit of inequality (10), the positive power of the lens L3 becomes relatively high. This makes it difficult to assure the back focal length of the entire system and to correct the high order off-axis color aberration which is generated in the lens L3. This also provides a strict condition to the accuracy of creating and arranging the lens L3, thus losing the utility.

Another eyepiece optical system 2 includes a first group of lenses G1 and a second group of lenses G2 arranged in order from the side of the incident pupil 1. The first group includes a positive meniscus lens L1 having a concave face toward the incident pupil 1, both-face aspherical lens L2 having a meniscus shape with both faces in the vicinity of center being convex toward the eye balls and a negative paraxial refractive power, and a both-face aspherical lens L3 with both faces being convex in the vicinity of center and positive paraxial refractive power, and has positive refractive power. The second group includes a both-face aspherical lens L4 with both faces being convex in the vicinity of center and negative paraxial refractive power.

In order to reduce color aberration, the lenses L1, L2 and L3 constituting the positive G1 group are made of a low dispersion glass material and the negative lens L4 is made of a high dispersion glass material. Assuming that the Abbe's number average value of the glass materials of the lenses L1, L2 and L3 is v13, and that of the glass material of the lens L4 is v4, v13 and v4 satisfy the following inequalities (1) and (2) simultaneously to correct color aberration desirably.

$$v13 > 40 \tag{1}$$

$$v4 < 30 \tag{2}$$

Since the refractive power of the group G1 is mainly occupied by L3, assuming that the Abbe's number of the glass materials constituting L3 and L4 are v3 and v4, v3 and v4 must satisfy the following inequalities (3b) and (4) to correct the color aberration.

$$v3 > 35 \tag{3b}$$

$$v4 < 30 \tag{4}$$

The lens L2 is constituted by a both-face aspherical lens having a meniscus shape with both faces in the vicinity of center being convex toward the eye balls and negative power in the vicinity of the center. L2 is curved so as to be concave toward the pupil 1 on both sides on the periphery, thereby providing a small incident angle for a peripheral light ray having a large tilt.

Assuming that the paraxial focal length of the G1 group (lens L1 to L3) and G2 group (lens L4) are f13 and f4, respectively, and the focal length of the entire system is f, they satisfy the following conditions.

$$0.2 < f13/f < 0.4 \quad (5b)$$

$$-0.18 < f4/f < -0.09 \quad (6b)$$

The inequalities (5b) and (6b) define the power distribution of the eyepiece optical system according to the present invention. Above the upper limit of inequality (5b), the positive power of the G1 group becomes low, thus resulting in excessive correction of the paraxial color aberration. Below the lower limit of inequality (5b), the positive power of the G1 group becomes high. This makes it impossible to assure a suitable back focal length and hence difficult to arrange the display element. This also results in shortage of correction in the paraxial color aberration, and makes it difficult to correct the high order off-axis aberration. Above the upper limit of inequality (6b), the negative power of the G2 group becomes high. This results in excessive correction of the paraxial color aberration, and provides a strict condition to the accuracy of creating and arranging the lens L4, thus loosing the utility. This also makes it difficult to correct the high order off-axis aberration. Below the lower limit of inequality (6b), the negative power of the G2 group becomes low. This makes it impossible to assure a suitable back focal length and hence difficult to arrange the display element. This also results in shortage of correction in the paraxial color aberration.

Assuming that the paraxial focal length of the G1 group and G2 group are f13 and f4, respectively, they satisfy the following-equations (7b).

$$-2.9 < f13/f4 < -1.7 \quad (7b)$$

Inequality (7b) limits the range of the ratio between the respective focal length of the G1 group and G2 group. Below the lower limit of inequality (7b), the negative power of the G2 group becomes relatively high. This makes it difficult to correct the high order off-axis aberration, which is generated in the G2 group (lens L4), and results in excessive correction of the paraxial color aberration. Above inequality (7b), the positive power of the G1 group becomes high relatively. This makes it difficult to assure the back focal length of the entire system and to correct the high order off-axis color aberration which is generated in the G1 group.

Assuming that the paraxial focal length of the lenses L3 and L4 are f3 and f4, respectively, they satisfy the following inequality (8b).

$$-2.8 < f3/f4 < -1.5 \quad (8b)$$

Inequality (8b) limits the range of the ratio between the focal length of the lens L3 dominating the power of the G1 group and the lens L4 constituting the G2 group. Below the lower limit of inequality (8b), the negative power of the lens L4 becomes high relatively. This makes it difficult to correct the high order off-axis aberration which is generated in the lens L4 and also results in excessive correction of the paraxial color aberration. This also provides a strict condition to the accuracy of creating and arranging the lens L4. Above the upper limit of inequality (8b), the positive power of the lens L3 becomes high relatively. This makes it difficult to assure the back focal length of the entire system and to correct the high order off-axis color aberration which is generated in the lens L3. This also provides a strict condition to the accuracy of creating and arranging the lens L3, thus loosing the utility.

Numerical embodiments according to the first to twelfth embodiments are shown below. The sections in the respective numerical embodiments correspond to FIGS. 1 to 12, respectively. Reference symbols in the tables are refer to as follows.

EPD: entrance pupil diameter (equal to an aperture diameter of an aperture stop AST)

f: focal length of the entire system (mm)

F/#: F number (at infinite conjugate)

ω: half view angle on an entrance pupil side m: surface number counted from the entrance pupil ri: a radius of curvature of the i-th surface counted from the entrance pupil (mm)

di: distance (thickness, spacial interval (mm)) from the i-th to the (i+1)-th surface counted from the entrance pupil ni: refractive index at the wavelength of 587.6 nm (d line) of the medium immediately after the i-th face counted from the entrance pupil vi: Abbe's number of the medium immediately after the i-th face counted from the entrance pupil AST: aperture stop face (equivalent to the entrance pupil surface)

ASP: aspherical surface

The above focal length, F number and half view angle are values over the wavelength of 546 nm.

The aspherical shape exhibited at ASP are defined by equations (11) and (12).

$$Z = (h^2/r)/\{1+[1-(1+K)\cdot(h/r)^2]^{1/2}\} + A4h^4 + A6h^6 + A8h^8 + A10h^{10} \quad (11)$$

$$h^2 = X^2 + Y^2 \quad (12)$$

where r is a radius of central curvature; K is a conic constant; A4, A6, A8 and A10 are 4-th order, 6-th order, 8-th order and 10-th order aspherical coefficients; h is a height from an optical axis Z.

The center of an aspherical face is located at the origin of a coordinate system (X, Y, Z), and the optical axis is orientated in the Z direction.

<Numerical embodiment 1>

EDP = 6 mm  
f = 21.81 mm  
F/# = 3.63  
ω = 56 deg

| m | ri | di | ni | vi | |
|---|---|---|---|---|---|
| 1 | Infinity | 10.5 | | | AST |
| 2 | −45.04546 | 3.316455 | 1.8160 | 46.6 | |
| 3 | −22.75357 | 0.25 | | | |
| 4 | −133.9276 | 4.01756 | 1.8348 | 42.7 | ASP |
| 5 | −26.32556 | 0.25 | | | ASP |
| 6 | 93.36159 | 9.329371 | 1.8155 | 44.3 | ASP |
| 7 | −6.144569 | 0.2018781 | | | ASP |
| 8 | −80.05402 | 3.674136 | 1.9525 | 20.4 | ASP |
| 9 | 4.31012 | | | | ASP |

<Aspherical Coefficient>

| m | K | $A_4$ | $A_6$ | $A_8$ | $A_{10}$ |
|---|---|---|---|---|---|
| 4 | −45.9858 | 7.043159e−05 | −1.025554e−06 | 2.338535e−09 | −1.744236e−12 |
| 5 | −45.33062 | −7.586274e−05 | 1.134576e−07 | −1.768406e−09 | 3.166384e−12 |
| 6 | −339.5848 | −1.030614e−05 | 9.367678e−09 | 4.62516e−11 | −8.498515e−15 |
| 7 | −7.568682 | −5.466875e−06 | −1.858385e−08 | −3.665305e−11 | 2.194468e−13 |
| 8 | 1.002814 | 3.82159e−06 | 4.282619e−08 | −4.547165e−11 | 4.919197e−14 |
| 9 | −7.516429 | 9.578363e−06 | 5.980394e−08 | −1.755436e−10 | −2.087746e−13 |

<Numerical embodiment 2>

EDP = 6 mm  
f = 20.31 mm  
F/# = 3.38  
ω = 56 deg

| m | ri | di | ni | vi | |
|---|---|---|---|---|---|
| 1 | Infinity | 10.5 | | | AST |
| 2 | −44.24487 | 3.804162 | 1.8807 | 41.0 | |
| 3 | −21.07042 | 0.25 | | | |
| 4 | −166.652 | 3.720332 | 1.8160 | 46.6 | ASP |
| 5 | −32.513 | 0.25 | | | ASP |
| 6 | 35.46585 | 11.50201 | 1.8040 | 46.6 | ASP |
| 7 | −5.99761 | 0.25 | | | ASP |
| 8 | −33.63471 | 1.5 | 1.9525 | 20.4 | ASP |
| 9 | 5.341317 | | | | ASP |

<Aspherical Coefficient>

| m | K | $A_4$ | $A_6$ | $A_8$ | $A_{10}$ |
|---|---|---|---|---|---|
| 4 | −304.1157 | 5.561548e−05 | −7.733623e−07 | 1.455519e−09 | −1.36614e−12 |
| 5 | −60.878 | −6.651137e−05 | 8.860424e−08 | −1.671758e−09 | 3.012685e−12 |
| 6 | −15.07173 | −1.54789e−05 | 1.205128e−08 | 2.367042e−11 | −2.393953e−14 |
| 7 | −11.57439 | −9.521767e−06 | −1.117273e−08 | −3.194844e−11 | 1.247825e−13 |
| 8 | −0.078735 | 9.979756e−06 | 4.632095e−08 | −3.620031e−11 | 3.641832e−14 |
| 9 | −9.636816 | 8.426464e−06 | 5.165409e−08 | −9.141098e−11 | −3.060515e−13 |

<Numerical embodiment 3>

EDP = 6 mm
f = 21.16 mm
F/# = 3.53
ω = 56 deg

| m | ri | di | ni | vi | |
|---|---|---|---|---|---|
| 1 | Infinity | 10.5 | | | AST |
| 2 | −51.444 | 4.340254 | 1.8830 | 40.8 | |
| 3 | −21.24836 | 0.25 | | | |
| 4 | −179.3775 | 3.950254 | 1.8160 | 46.6 | ASP |
| 5 | −27.7324 | 0.25 | | | ASP |
| 6 | 35.65293 | 11.07466 | 1.7950 | 45.3 | ASP |
| 7 | −7.162459 | 0.25 | | | ASP |
| 8 | −31.29718 | 1.5 | 1.9525 | 20.4 | ASP |
| 9 | 5.683252 | | | | ASP |

<Aspherical Coefficient>

| m | K | $A_4$ | $A_6$ | $A_8$ | $A_{10}$ |
|---|---|---|---|---|---|
| 4 | −143.4814 | 6.745549e−05 | −6.871236e−07 | 1.222572e−09 | −1.148494e−12 |
| 5 | −49.40098 | −5.573695e−05 | 9.86958e−08 | −1.395416e−09 | 2.50521e−12 |
| 6 | −18.73 | −1.200476e−05 | 1.381205e−08 | 2.363223e−11 | −3.204663e−14 |
| 7 | −13.47776 | −1.183764e−05 | −1.055019e−08 | −2.581809e−11 | 1.097464e−13 |
| 8 | −0.057453 | 8.105864e−06 | 5.377566e−08 | −4.00196e−11 | 3.603745e−14 |
| 9 | −9.976727 | 9.04482e−06 | 4.509675e−08 | −9.557288e−11 | −2.718622e−13 |

<Numerical embodiment 4>

EDP = 6 mm
f = 21.37 mm
F/# = 3.56
ω = 56 deg

| m | ri | di | ni | vi | |
|---|---|---|---|---|---|
| 1 | Infinity | 10.5 | | | AST |
| 2 | −45.64594 | 3.612241 | 1.8830 | 40.8 | |
| 3 | −22.00113 | 0.25 | | | |
| 4 | −209.0151 | 4.229248 | 1.8160 | 46.6 | ASP |
| 5 | −33.55573 | 8.25 | | | ASP |
| 6 | −31.59407 | 11.86347 | 1.7725 | 49.6 | ASP |
| 7 | −6.132337 | 0.25 | | | ASP |
| 8 | −24.82141 | 1.5 | 1.8467 | 23.8 | ASP |
| 9 | 4.947096 | | | | ASP |

<Aspherical Coefficient>

| m | K | $A_4$ | $A_6$ | $A_8$ | $A_{10}$ |
|---|---|---|---|---|---|
| 4 | −325.4723 | 6.868719e−05 | −7.776098e−07 | 1.491398e−09 | −1.194678e−12 |
| 5 | −78.39335 | −6.444426e−05 | 5.811913e−08 | −1.235044e−09 | 2.192964e−12 |
| 6 | −10.40482 | −1.391581e−05 | 1.571315e−08 | 1.740211e−11 | −2.099345e−14 |
| 7 | −13.23207 | −1.470683e−05 | −6.375473e−09 | −1.023147e−11 | 9.043581e−14 |
| 8 | −0.50721 | 1.496252e−05 | 4.950097e−08 | −2.674522e−11 | 1.840937e−14 |
| 9 | −11.52178 | 1.245852e−05 | 5.161963e−08 | −3.914282e−11 | −4.67683e−13 |

<Numerical embodiment 5>

EDP = 6 mm
f = 24.03 mm
F/# = 3.77
ω = 56 deg

| m | ri | di | ni | νi | |
|---|---|---|---|---|---|
| 1 | Infinity | 0.5 | | | AST |
| 2 | −38.91415 | 3.35187 | 1.8830 | 40.8 | |
| 3 | −20.88553 | 0.25 | | | |
| 4 | 92.68053 | 4.185537 | 1.8830 | 40.8 | ASP |
| 5 | −140.6171 | 0.25 | | | ASP |
| 6 | 23.22259 | 12.35904 | 1.7550 | 52.3 | ASP |
| 7 | −6.365386 | 0.25 | | | ASP |
| 8 | −17.91562 | 1.5 | 1.8080 | 22.6 | ASP |
| 9 | 4.585392 | | | | ASP |

<Aspherical Coefficient>

| m | K | $A_4$ | $A_6$ | $A_8$ | $A_{10}$ |
|---|---|---|---|---|---|
| 4 | −867.2811 | 4.337649e−05 | −6.487407e−07 | 9.97106e−10 | −6.556957e−13 |
| 5 | −14.50158 | −8.464131e−05 | 1.564963e−07 | −1.363914e−09 | 1.711589e−12 |
| 6 | −30.2371 | −2.933368e−06 | 5.176864e−09 | 1.398831e−12 | 1.46902e−14 |
| 7 | −10.49072 | −1.613988e−05 | −9.294655e−09 | 1.83324e−11 | 7.250452e−14 |
| 8 | −0.81158 | 3.251414e−05 | 4.735746e−08 | −5.409327e−11 | 3.235442e−14 |
| 9 | −12.98792 | 5.554229e−06 | 8.443178e−08 | 4.238982e−12 | −6.828975e−13 |

<Numerical embodiment 6>

EDP = 6 mm
f = 23.78 mm
F/# = 3.96
ω = 56 deg

| m | ri | di | ni | νi | |
|---|---|---|---|---|---|
| 1 | Infinity | 0.5 | | | AST |
| 2 | −38.73229 | 3.411368 | 1.8830 | 40.8 | |
| 3 | −20.66834 | 0.25 | | | |
| 4 | 97.37884 | 4.206376 | 1.8830 | 40.8 | ASP |
| 5 | −137.67 | 0.25 | | | ASP |
| 6 | 23.5455 | 12.2262 | 1.7725 | 49.6 | ASP |
| 7 | −6.512027 | 0.25 | | | ASP |
| 8 | −17.65735 | 1.5 | 1.8052 | 25.5 | ASP |
| 9 | 4.625096 | | | | ASP |

<Aspherical Coefficient>

| m | K | $A_4$ | $A_6$ | $A_8$ | $A_{10}$ |
|---|---|---|---|---|---|
| 4 | −1055.646 | 4.513538e−05 | −6.367015e−07 | 9.77353e−10 | −7.034807e−13 |
| 5 | −0.7327996 | −8.316975e−05 | 1.621777e−07 | −1.334093e−09 | 1.612616e−12 |
| 6 | −30.15695 | −2.679588e−06 | 4.889545e−09 | 2.915183e−12 | 2.191352e−14 |
| 7 | −10.94277 | −1.663278e−05 | −7.274563e−09 | 2.215106e−11 | 7.487705e−14 |
| 8 | −0.8291359 | 3.222649e−05 | 4.825236e−08 | −5.335299e−11 | 2.792985e−14 |
| 9 | −12.76251 | 3.450712e−06 | 9.454087e−08 | 1.800087e−11 | −7.525266e−13 |

<Numerical embodiment 7>

EDP = 6 mm
f = 25.90 mm
F/# = 4.32
ω = 56 deg

| m | ri | di | ni | vi | |
|---|---|---|---|---|---|
| 1 | Infinity | 10.5 | | | AST |
| 2 | −41.60902 | 3.789276 | 1.8830 | 40.8 | |
| 3 | −21.02333 | 0.25 | | | |
| 4 | 94.15902 | 5.071245 | 1.8350 | 43.0 | ASP |
| 5 | −181.9018 | 0.25 | | | ASP |
| 6 | 19.15764 | 11.67284 | 1.7725 | 49.6 | ASP |
| 7 | −6.261615 | 0.25 | | | ASP |
| 8 | −15.06552 | 1.5 | 1.8052 | 25.5 | ASP |
| 9 | −3.868246 | | | | ASP |

<Aspherical Coefficient>

| m | K | $A_4$ | $A_6$ | $A_8$ | $A_{10}$ |
|---|---|---|---|---|---|
| 4 | −114.0167 | 3.57517e−05 | −6.08741e−07 | 1.13578e−09 | −9.315231e−13 |
| 5 | −441.5641 | −0.0001110253 | 2.185218e−07 | −1.043809e−09 | 1.102465e−12 |
| 6 | −40.41946 | −4.69264e−06 | −9.30649e−11 | 7.101406e−12 | 5.140128e−14 |
| 7 | −9.93582 | −1.526413e−05 | −4.711264e−09 | 2.057711e−11 | 8.296913e−14 |
| 8 | −1.00475 | 4.258582e−05 | 4.678459e−08 | −7.362437e−11 | 2.191701e−14 |
| 9 | −14.22058 | 8.555006e−06 | 8.898327e−08 | 2.824739e−11 | −7.848033e−13 |

<Numerical embodiment 8>

EDP = 6 mm
f = 26.23 mm
F/# = 4.37
ω = 56 deg

| m | ri | di | ni | vi | |
|---|---|---|---|---|---|
| 1 | Infinity | 10.5 | | | AST |
| 2 | −45.01053 | 4.095558 | 1.8830 | 40.8 | |
| 3 | −21.15416 | 0.25 | | | |
| 4 | 86.79655 | 5.219285 | 1.8061 | 40.7 | ASP |
| 5 | −173.4184 | 0.25 | | | ASP |
| 6 | 19.52489 | 12.02728 | 1.7292 | 54.7 | ASP |
| 7 | −6.034705 | 0.25 | | | ASP |
| 8 | −14.64168 | 1.5 | 1.8052 | 25.5 | ASP |
| 9 | 3.870792 | | | | ASP |

<Aspherical Coefficient>

| m | K | $A_4$ | $A_6$ | $A_8$ | $A_{10}$ |
|---|---|---|---|---|---|
| 4 | −95.02695 | 3.91175e−05 | −5.900483e−07 | 1.114434e−09 | −9.953088e−13 |
| 5 | −464.5414 | −0.0001080843 | 2.10129e−07 | −1.010438e−09 | 1.158115e−12 |
| 6 | −39.54762 | −4.506781e−06 | 1.334795e−10 | 7.40027e−12 | 5.168014e−14 |
| 7 | −10.03744 | −1.588742e−05 | −4.665028e−09 | 2.058264e−11 | 8.253717e−14 |
| 8 | −0.989521 | 4.329757e−05 | 4.77817e−08 | −7.236744e−11 | 1.996345e−14 |
| 9 | −15.18225 | 7.620036e−06 | 9.010817e−08 | 2.973419e−11 | −7.969819e−13 |

<Numerical embodiment 9>

EDP = 6 mm
f = 24.17 mm
F/# = 4.03
ω = 56 deg

| m | ri | di | ni | vi | |
|---|---|---|---|---|---|
| 1 | Infinity | 10.5 | | | AST |
| 2 | −60.59758 | 4.790476 | 1.8830 | 40.8 | |
| 3 | −21.63433 | 0.25 | | | |
| 4 | 74.16574 | 3.907311 | 1.7859 | 43.9 | ASP |
| 5 | −171.287 | 0.25 | | | ASP |
| 6 | 25.68461 | 12.11108 | 1.7130 | 53.9 | ASP |
| 7 | −6.21696 | 0.25 | | | ASP |
| 8 | −13.65374 | 1.5 | 1.8052 | 25.5 | ASP |
| 9 | 5.005129 | | | | ASP |

<Aspherical Coefficient>

| m | K | $A_4$ | $A_6$ | $A_8$ | $A_{10}$ |
|---|---|---|---|---|---|
| 4 | −235.1343 | 4.990294e−05 | −6.218591e−07 | 9.885815e−10 | −1.550543e−12 |
| 5 | −4799.484 | −0.0001008259 | 2.470179e−07 | −1.353647e−09 | 1.216031e−12 |
| 6 | −52.81693 | −2.733744e−06 | −5.3756e−10 | 7.702574e−13 | 6.655573e−14 |
| 7 | −7.851063 | −1.739428e−05 | −3.02908e−09 | 2.334678e−11 | 1.006921e−13 |
| 8 | −0.957450 | 5.762577e−05 | 3.409564e−08 | −6.923643e−11 | 2.146387e−14 |
| 9 | −16.95332 | 1.102747e−05 | 7.821638e−08 | 3.373738e−11 | −7.553734e−13 |

<Numerical embodiment 10>

EDP = 6 mm
f = 21.66 mm
F/# = 3.61
ω = 56 deg

| m | ri | di | ni | vi | |
|---|---|---|---|---|---|
| 1 | Infinity | 10.5 | | | AST |
| 2 | −83.94958 | 5.591225 | 1.8830 | 40.8 | |
| 3 | −22.0421 | 0.25 | | | |
| 4 | 78.22017 | 3.043829 | 1.7859 | 43.9 | ASP |
| 5 | −260.3543 | 0.25 | | | ASP |
| 6 | 34.5409 | 11.89978 | 1.7138 | 53.9 | ASP |
| 7 | −5.852684 | 0.5 | | | ASP |
| 8 | −16.05312 | 1.0 | 1.8052 | 25.5 | ASP |
| 9 | 5.467511 | | | | ASP |

<Aspherical Coefficient>

| m | K | $A_4$ | $A_6$ | $A_8$ | $A_{10}$ |
|---|---|---|---|---|---|
| 4 | −214.0301 | 3.087361e−05 | −4.692963e−07 | 8.720126e−10 | −2.358515e−12 |
| 5 | −27509 | −7.97848e−05 | 1.990878e−07 | −1.416872e−09 | 1.455528e−12 |
| 6 | −17.17738 | −2.673446e−06 | −3.643e−10 | −3.132968e−13 | 5.020345e−14 |
| 7 | −12.9347 | −1.674952e−05 | −6.40618e−09 | 2.007374e−11 | 8.914182e−14 |
| 8 | −0.91542 | 4.112962e−05 | 4.345367e−08 | −5.467466e−11 | 1.621502e−14 |
| 9 | −15.7538 | 5.456956e−06 | 9.362635e−08 | 2.322972e−11 | −7.346113e−13 |

<Numerical embodiment 11>

EDP = 6 mm
f = 23.88 mm
F/# = 3.98
ω = 56 deg

| m | ri | di | ni | vi | |
|---|---|---|---|---|---|
| 1 | Infinity | 1.0500000E+01 | | | AST |
| 2 | −1.4253915E+03 | 6.6410927E+00 | 1.8830 | 40.8 | |
| 3 | −2.8672968E+01 | 2.6000000E−01 | | | |
| 4 | 5.3917303E+01 | 4.8000000E+00 | 1.7859 | 43.9 | ASP |
| 5 | 3.4516169E+01 | 2.6000000E−01 | | | ASP |
| 6 | 4.2691875E+01 | 9.0846706E+00 | 1.8160 | 46.6 | ASP |
| 7 | −5.7620008E+00 | 9.1463357E−01 | | | ASP |
| 8 | −2.6408060E+01 | 4.0047884E+00 | 2.0029 | 23.5 | ASP |
| 9 | 4.2509951E+00 | | | | ASP |

<Aspherical Coefficient>

| m | K | $A_4$ | $A_6$ | $A_8$ | $A_{10}$ |
|---|---|---|---|---|---|
| 4 | −8.6715465E+01 | 2.44550404E−05 | −1.80003173E−08 | 2.60086290E−10 | −6.02486611E−13 |
| 5 | −3.8066772E+02 | −7.18603862E−05 | 4.32218393E−07 | −7.41664635E−10 | 2.74225659E−13 |
| 6 | −4.6399300E+01 | 1.25572634E−06 | 4.32654878E−09 | 4.72105636E−13 | 2.31201158E−15 |
| 7 | −1.2292602E+01 | −1.34748564E−06 | −4.71037014E−09 | 1.81619927E−11 | 2.46177364E−14 |
| 8 | 1.07008447E−01 | 4.24395933E−06 | 8.00589242E−08 | −6.75823231E−11 | 8.90023730E−14 |
| 9 | −1.6119969E+01 | 1.44171082E−05 | −1.66560073E−08 | −1.40848891E−11 | −1.59706873E−13 |

<Numerical embodiment 12>

EDP = 6 mm
f = 25.55 mm
F/# = 4.25
ω = 56 deg

| m | ri | di | ni | vi | |
|---|---|---|---|---|---|
| 1 | Infinity | 1.0500000e−01 | | | AST |
| 2 | −1.4310488E+03 | 7.1921813E+00 | 1.8160 | 46.6 | |
| 3 | −2.6886586E+01 | 2.6000000E−01 | | | |
| 4 | 5.4423821E+01 | 4.8000000E+00 | 1.7880 | 47.5 | ASP |
| 5 | 2.7726058E+01 | 2.6000000E−01 | | | ASP |
| 6 | 4.0922715E+01 | 8.6250000E+00 | 1.8830 | 40.8 | ASP |
| 7 | −5.9636066E+00 | 1.1016488E+00 | | | ASP |
| 8 | −2.8798947E+01 | 3.6627207E+00 | 1.9229 | 20.9 | ASP |
| 9 | 3.3170294E+00 | | | | ASP |

<Aspherical Coefficient>

| m | K | $A_4$ | $A_6$ | $A_8$ | $A_{10}$ |
|---|---|---|---|---|---|
| 4 | −6.8375875E+01 | 2.36125101E−05 | −1.19817332E−08 | 2.09551207E−10 | −4.74993787E−13 |
| 5 | −2.9123669E+02 | −7.00821014E−05 | 4.31134653E−07 | −7.43067511E−10 | 2.98203250E−13 |
| 6 | −9.5992459E+01 | 2.64362107E−06 | 5.40376339E−09 | 1.74429353E−13 | −3.79650769E−15 |
| 7 | −1.3775561E+01 | −2.53033321E−06 | −4.42407645E−09 | 1.96394225E−11 | 2.22965057E−14 |
| 8 | 3.4435029E−01 | −1.81371860E−06 | 8.25545578E−08 | −7.25019843E−11 | 8.09368097E−14 |
| 9 | −1.2455198E+01 | 1.53727156E−05 | −6.90665830E−09 | −1.61666005E−11 | −2.64664661E−13 |

The values of focal length at the respective portion of a lens system, ratios therebetween, and average Abbe's numbers are shown in Table 1 for numerical embodiments 1–12. Symbols in the table are referred to as follows.

f: focal length in the entire system (mm)

f1: focal length of the lens L1 (mm)

f2: paraxial focal length (mm) of the lens L2 f3: paraxial focal length (mm) of the lens L3 f4: paraxial focal length (mm) of the lens L4 (G2 group)

f13: composite focal length (mm) of the G1 group (lenses L1 to L3)

v13: average value of the Abbe's number of the glass materials of the lenses L1, L2 and L3

The above focal length are values at a wavelength of 546 nm

TABLE 1

| Example | f | f1 | f2 | f3 | f4 | f13 | f4/f | f13/f | f13/f4 | f3/f4 | v13 |
|---|---|---|---|---|---|---|---|---|---|---|---|
| 1 | 21.81 | 52.54 | 38.38 | 7.34 | −4.16 | 6.72 | −0.19 | 0.31 | −1.62 | −1.76 | 44.5 |
| 2 | 20.31 | 42.16 | 48.64 | 7.25 | −4.7 | 7.03 | −0.23 | 0.35 | −1.50 | −1.54 | 44.7 |
| 3 | 21.16 | 38.18 | 39.53 | 8.43 | −4.89 | 7.61 | −0.23 | 0.36 | −1.56 | −1.72 | 44.2 |
| 4 | 21.37 | 44.62 | 48.21 | 7.67 | −4.71 | 7.46 | −0.22 | 0.35 | −1.58 | −1.63 | 45.7 |
| 5 | 24.03 | 46.68 | 63.43 | 8.03 | −4.34 | 7.99 | −0.18 | 0.33 | −1.84 | −1.85 | 44.6 |
| 6 | 23.78 | 45.83 | 64.76 | 7.99 | −4.38 | 7.91 | −0.18 | 0.33 | −1.81 | −1.82 | 43.7 |
| 7 | 25.9 | 44.03 | 74.52 | 7.61 | −3.66 | 7.67 | −0.14 | 0.30 | −2.10 | −2.08 | 44.5 |
| 8 | 26.23 | 41.58 | 71.99 | 7.86 | −3.64 | 8.04 | −0.14 | 0.31 | −2.21 | −2.16 | 45.4 |
| 9 | 24.17 | 35.81 | 65.96 | 8.31 | −4.35 | 8.29 | −0.18 | 0.34 | −1.91 | −1.91 | 46.2 |
| 10 | 21.66 | 32.28 | 76.43 | 7.97 | −4.92 | 8.0 | −0.23 | 0.37 | −1.63 | −1.62 | 46.2 |
| 11 | 23.88 | 32.87 | −136.3 | 6.76 | −3.39 | 7.38 | −0.14 | 0.31 | −2.18 | −1.99 | 43.8 |
| 12 | 25.54 | 33.33 | −77.53 | 6.42 | −3.02 | 7.05 | −0.12 | 0.28 | −2.33 | −2.13 | 45.0 |

FIGS. 13 to 24 are views showing transverse aberrations corresponding to the above first to twelfth numerical embodiments. EY denotes an aberration in a meridional section and EX denotes an aberration in a sagittal section. WL1, WL2 and WL3 are curves for wavelengths of 470 nm, 546 nm and 610 nm, respectively. These transverse aberrations are those on the side of the conjugate (image display element 3) which is small for four incident view angles (incident from infinity). As seen from FIGS. 13 to 24, the numerical embodiments can provide an enlarged virtual image which is corrected in an transverse aberration and color aberration and has a high resolution over a wide view angle of an opposite angle of 110° or more.

Embodiments 13 and 14

Figure 25:
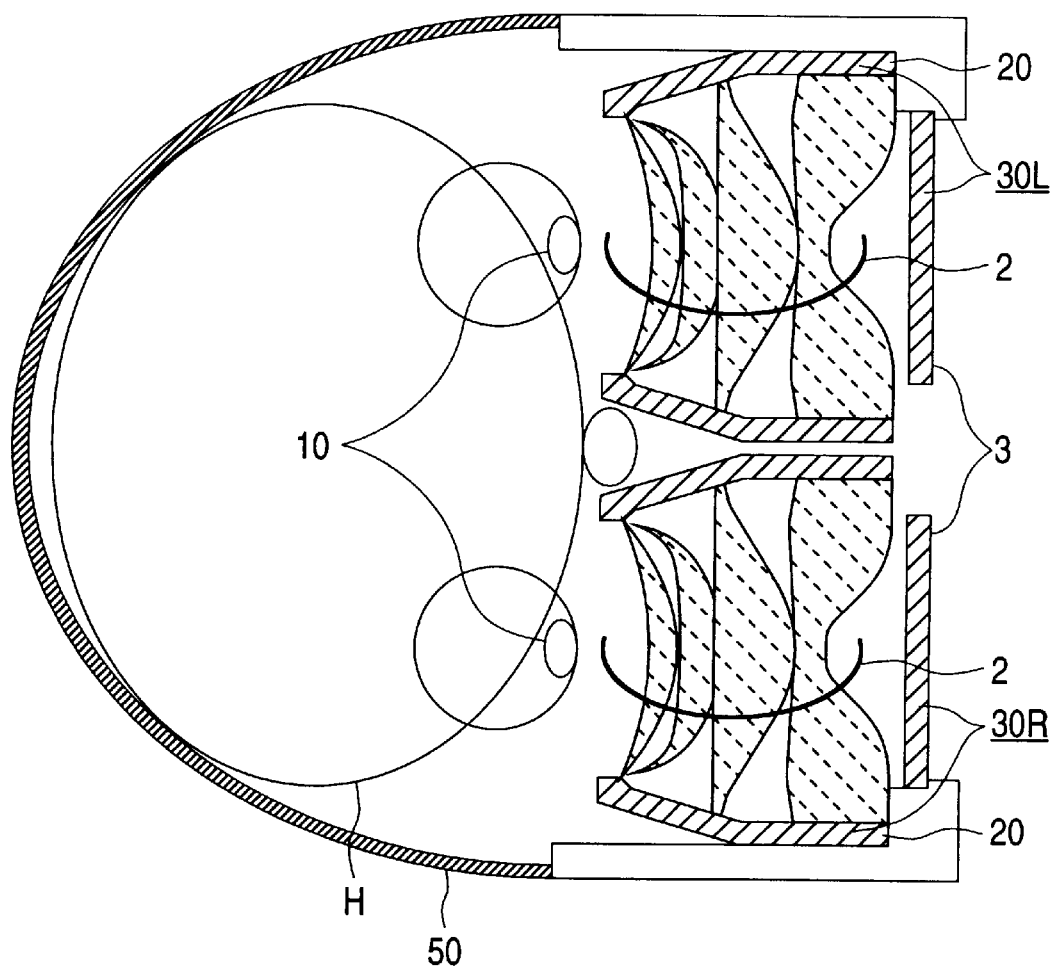
FIG. 25 is a view of an eyepiece optical system according to the thirteenth numerical embodiment of the present invention.
Figure 26:
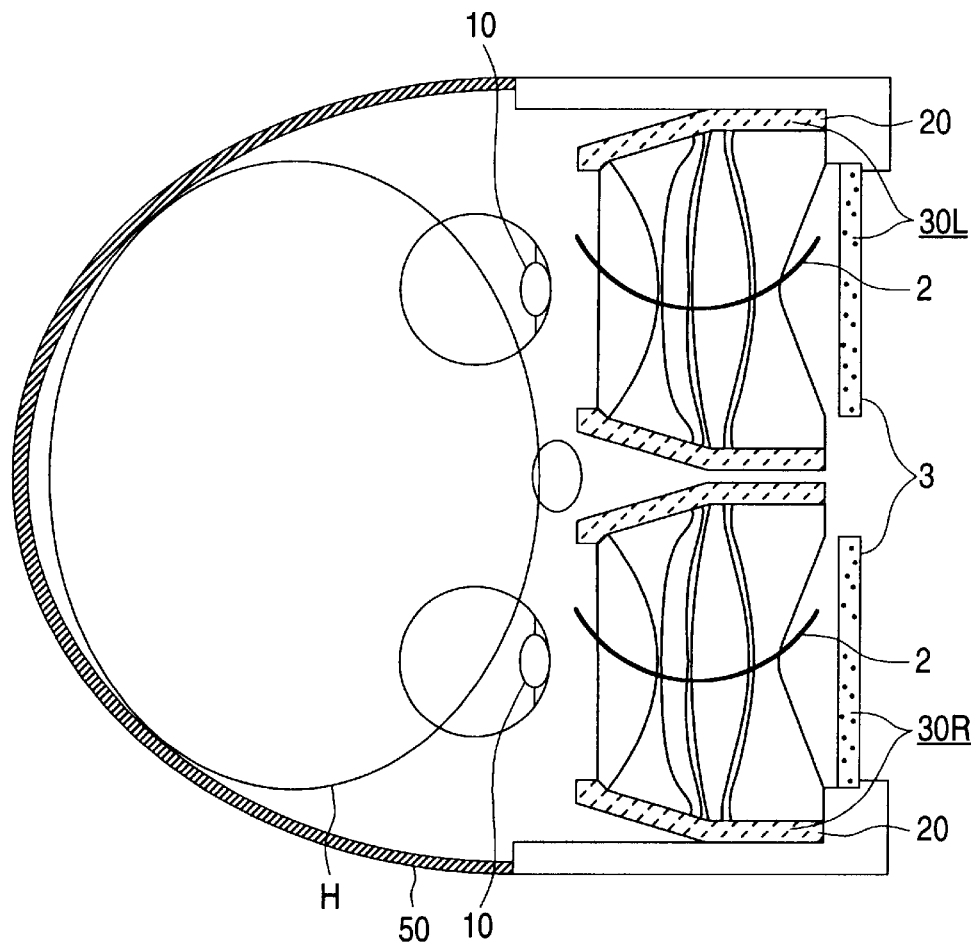
FIG. 26 is a view of an eyepiece optical system according to the fourteenth numerical embodiment of the present invention.
Figure 27:
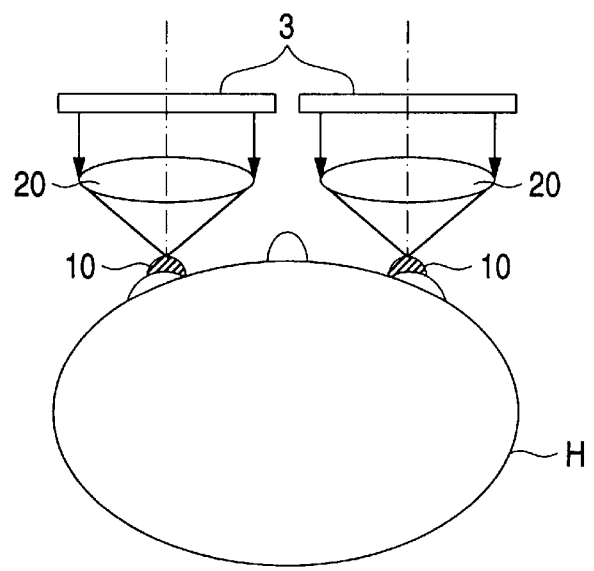
FIG. 27 is a view showing the arrangement of a conventional eyepiece image display device.

Now referring to FIGS. 25 and 26, an explanation will be given of an eyepiece image display device equipped with the eyepiece optical system illustrated in each of the first to twelfth embodiments. In FIGS. 25 and 26, reference numeral 3 denotes one of two two-dimensional display elements; 2 denotes one of the eyepiece optical systems illustrated in the first to twelfth numerical embodiments; 20 denotes one of eyepiece optical devices each equipped with the eyepiece optical system; 10 denotes one of the eyeballs of an observer H; 30L and 30R denote display units each including the two-dimensional display element 3 and eyepiece optical device 20; 50 denotes a belt mechanism for securing the left and right display units 30L and 30R to the head of the observer H.

The two-dimensional display element 3 may be an miniaturized display element such as LCD, ELD, FED, CRT, etc. In the case of the LCD, which is not a self light-emitting display element, a light source (not shown) such as a fluorescent lamp, LED, EL, etc. is installed in the display element 3. In the case of using a self-light-emitting element such as ELD, FED, CRT as the two dimensional display element, a combination of these light sources is not required.

The original image created on an image creating face of the two-dimensional display element 3 is converted into an enlarged virtual image by the eyepiece optical system 2. This enlarged virtual image thus obtained is observed by the eyeball 10. The eyepiece display device shown in FIGS. 25 and 26, which is equipped with the eyepiece optical systems 2 according to the present invention, can provide a large observing view angle, over 110° or more and a large freedom of pupil position by provision of a suitable pupil diameter and eye relief to present a uniform and clear observed image to the periphery. Thus, an image with excellent realism and clarity can be displayed over a large angle.

Even when the images presented to the left and right eyes are superposed entirely (100%), the entire view angle in the eyepiece optical system according to the present invention is as large as 110° or more. However, by displaying the left and right presented images in a manner shifted outward in a horizontal direction, the horizontal view angle can be enlarged. Therefore, the created images corresponding to the left and right are preferably moved outward in the horizontal direction by the techniques of (1) horizontally shifting the center of the image display element 3 for the optical axis of the eyepiece optical system 2 to move the virtual image outward in the horizontal direction, and (2) tilting the entire display units (30L, 30R) each including the eyepiece optical device 20 and two-dimensional display element 3 in the horizontal plane, respectively so that the areas where the virtual images are created are moved outward in appearance. Also when the same image is displayed on both two-dimensional display elements in a state with the left and right enlarged displayed images being superposed in 100%, good realism can be obtained because of their large view angle. In both cases where the left and right enlarged images are superposed in 100% and are shifted outward in the horizontal direction, if a binocular parallax image is displayed on the left and right two-dimensional display elements, the realism can be further enhanced owing to the effect of three-dimensional viewing.

It should be noted that the eyepiece optical device 20 and two-dimensional display element 3 are integrally installed in an actual display device and a belt mechanism is provided to secure the entire display device to the head of the observer H. However, a sight type eyepiece display device in which the display units 30L and 30R are housed in a common box does not necessarily require the belt mechanism 50. The interval between the eyepiece optical device 20 and two-dimensional display element 3 in the optical axial direction and that between the display units 30L and 30R may be adjusted according to the property of the eyes of the observer H and interval between the pupils by an adjusting mechanism so that an optimum display characteristic can be presented for each observer. In FIGS. 25 and 26, although the eyepiece image display device is provided with two sets of the eyepiece optical device 20 and two-dimensional display element 3 for observation by both eyes, it may be modified so as to be provided with a single set of these components for observation by a single eye.

The present invention, which is structured as described above, has the following effects.

The eyepiece optical system according to the present invention satisfies the following conditions simultaneously:

(1) a large view angle of 110° or more in an opposite angle
(2) a small F number (large pupil diameter)
(3) a suitable eye relief (distance from the eye of an observer to the first surface of the eyepiece lens)
(4) good aberration correction.

Thus, the present invention can provide an eyepiece optical system which is aberration-corrected so as to provide a wide view angle in an opposite angle 110° or more for a single eye, a large freedom of pupil position by provision of a suitable pupil diameter and eye relief and a uniform and clear observed image to the periphery.

The present invention can provide a compact and light weight eyepiece image display device equipped with the above eyepiece optical system which can provide a wide view angle, excellent sense of reality and clear visual display.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. An eyepiece optical system for projecting a plane image on a two-dimensional display element onto an eyeball as an extended virtual image comprising:
   a first group of lenses G1 including;
      a positive meniscus lens L1 having a concave face toward the eyeball,
      a both-face aspherical lens L2; and
      a both-face aspherical lens L3 having both convex faces in the vicinity of center and positive paraxial refractive power; and
   a second group of lenses G2 including;
      a both-face aspherical lens L4 having both concave faces in the vicinity of center and negative paraxial refractive power, wherein
      said first and second groups of lenses are arranged in order from the side of the eyeball.

2. The eyepiece optical system of claim 1, wherein said both-face aspherical lens L2 has positive paraxial refractive power.

3. The eyepiece optical system of claim 1, wherein said both-face aspherical lens L2 has a meniscus shape having a convex shape toward the side of the eyeball in the vicinity of center and negative paraxial refractive power.

4. The eyepiece optical system of claim 1, wherein said both-face aspherical lens L2 is curved so as to be concave toward the side of the eyeball on both faces on the periphery.

5. The eyepiece optical system of claim 1, wherein the paraxial focal length of said first group of lenses G1 and said second group of lenses G2 are denoted by f13 and f4, respectively, and the focal length of the entire eyepiece optical system is denoted by f, and wherein the conditions $$0.2 < f13/f4 < 0.45 \text{ and}$$

$$-0.3 < f4/f < -0.09$$

are satisfied.

6. The eyepiece optical system of claim 1, wherein the paraxial focal length of said first group of lenses G1 and said second group of lenses G2 are denoted by f13 and f4, respectively, and wherein the condition $$-2.9 < f13/f4 < -1.2$$

is satisfied.

7. The eyepiece optical system of claim 1, wherein the paraxial focal length of the lenses L3 and L4 are denoted by f3 and f4, respectively, and wherein the conditions $$-2.8 < f3/f4 < -1.2$$

is satisfied.

8. The eyepiece optical system of claim 1, wherein the Abbe's number average value of a glass material of the lenses L1, L2 and L3 is denoted by v13, and that of a glass material of the lens L4 is denoted by v4, wherein the conditions $$v13 > 40 \text{ and}$$

$$v4 < 30$$

are satisfied.

9. The eyepiece optical system of claim 1, wherein the Abbe's number average values of a glass material of the lenses L3 and L4 are denoted by v3 and v4, respectively, wherein the conditions $$v3 > 35 \text{ and}$$

$$v4 < 30$$

are satisfied.

10. An eyepiece image display device comprising:
    a first two-dimensional display element for displaying a first original image; and
    a first eyepiece optical system in optical communication with said first two-dimensional display element, said first eyepiece optical system projecting a plane image on said first two-dimensional display element onto an eyeball as an extended virtual image,
    said first eyepiece optical system including
       a first group of lenses G1 having;
          a positive meniscus lens L1 having a concave face toward the eyeball;
          a both-face aspherical lens L2; and
          a both-face aspherical lens L3 having both convex faces in the vicinity of a center and positive paraxial refractive power; and
       a second group of lenses G2 having;
          a both-face aspherical lens L4 having both concave faces in the vicinity of a center and negative paraxial refractive power,
          wherein said first group and said second group of lenses are arranged in order from the side of the eyeball.

11. The eyepiece image display device of claim 10, wherein
said both-face aspherical lens L2 has positive paraxial refractive power.

12. The eyepiece image display device of claim 10, wherein
said both-face aspherical lens L2 has a meniscus shape having a convex shape toward the side of the eyeball in the vicinity of a center and negative paraxial refractive power.

13. The eyepiece optical system of claim 2, wherein the paraxial focal length of said first group of lenses G1 and said second group, of lenses G2 are denoted by f13 and f4, respectively, and the focal length of the entire eyepiece optical system is denoted by f, and wherein the conditions $$0.25 < f13/f4 < 0.45 \text{ and}$$

$$-0.3 < f4/f < -0.1$$

are satisfied.

14. The eyepiece optical system of claim 2, wherein the paraxial focal length of said first group of lenses G1 and said second group of lenses G2 are denoted by f13 and f4, respectively, and wherein the condition $$-2.7 < f13/f4 < -1.2$$

is satisfied.

15. The eyepiece optical system of claim 2, wherein the paraxial focal length of the lenses L3 and L4 are denoted by f3 and f4, respectively, and wherein the condition $$-2.7 < f3/f4 < -1.2$$

is satisfied.

16. The eyepiece optical system of claim 2, wherein the Abbe's number values of a glass material of the lenses L3 and L4 are denoted by v3 and v4, respectively, and wherein the conditions $$v3 > 40 \text{ and}$$

$$v4 < 30$$

are satisfied.

17. The eyepiece optical system of claim 3, wherein the paraxial focal length of said first group of lenses G1 and said second group of lenses G2 are denoted by f13 and f4, respectively, and the focal length of the entire eyepiece optical system is denoted by f, and wherein the conditions $$0.2 < f13/f4 < 0.4 \text{ and}$$

$$-0.18 < f4/f < -0.09$$

are satisfied.

18. The eyepiece optical system of claim 3, wherein the paraxial focal length of said first group of lenses G1 and said second group of lenses G2 are denoted by f13 and f4, respectively, and wherein the condition $$-2.9 < f13/f4 < -1.7$$

is satisfied.

19. The eyepiece optical system of claim 3, wherein the paraxial focal length of the lenses L3 and L4 are denoted by f3 and f4, respectively, and wherein the condition $$-2.8 < f3/f4 < -1.5$$

is satisfied.

20. The eyepiece optical system of claim 3, wherein the Abbe's number values of a glass material of the lenses L3 and L4 are denoted by v3 and v4, respectively, and wherein the conditions $$v3 > 35 \text{ and}$$

$$v4 < 30$$

are satisfied.

21. The eyepiece image display device of claim 10, further comprising:

a second two-dimensional display element for displaying an original image;

a second eyepiece optical system in optical communication with said second two-dimensional display element, said second eyepiece optical system projecting a plane image on said second two-dimensional display element onto a second eyeball as an extended virtual image, said second eyepiece optical system including
a first group of lenses G1 having;
a positive meniscus lens L1 having a concave face toward the second eyeball;
a both-face aspherical lens L2; and
a both-face aspherical lens L3 having both convex faces in the vicinity of a center and positive paraxial refractive power; and
a second group of lenses G2 having;
a both-face aspherical lens L4 having both concave faces in the vicinity of a center and negative paraxial refractive power,
wherein said first group and said second group of lenses are arranged in order from the side of the second eyeball.

22. The eyepiece image display device of claim 21, further comprising:
a mounting structure capable of securing said eyepiece image display device to the head of an observer.

23. The eyepiece image display device of claim 22, wherein said mounting structure is a belt mechanism.

* * * * *